(12) United States Patent
Sakurai

(10) Patent No.: US 9,680,721 B2
(45) Date of Patent: Jun. 13, 2017

(54) ASCERTAINMENT METHOD AND DEVICE

(71) Applicant: FUJITSU LIMITED, Kawasaki-shi, Kanagawa (JP)

(72) Inventor: Kazuto Sakurai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 166 days.

(21) Appl. No.: 14/629,897

(22) Filed: Feb. 24, 2015

(65) Prior Publication Data

US 2015/0281013 A1 Oct. 1, 2015

(30) Foreign Application Priority Data

Mar. 25, 2014 (JP) ................................. 2014-062554

(51) Int. Cl.
| | | |
|---|---|---|
| *H04L 12/24* | (2006.01) | |
| *H04L 12/26* | (2006.01) | |
| *H04L 29/08* | (2006.01) | |
| *H04L 12/911* | (2013.01) | |

(52) U.S. Cl.
CPC ............ *H04L 43/065* (2013.01); *H04L 41/12* (2013.01); *H04L 47/78* (2013.01); *H04L 67/1002* (2013.01)

(58) Field of Classification Search
CPC ....... H04L 41/12; H04L 47/78; H04L 43/065; H04L 67/1002
See application file for complete search history.

(56) References Cited

U.S. PATENT DOCUMENTS

| | | | | |
|---|---|---|---|---|
| 8,495,215 | B2* | 7/2013 | Okazaki | H04L 12/2809 |
| | | | | 709/226 |
| 9,143,442 | B2* | 9/2015 | Yang | H04L 45/54 |
| 2007/0244937 | A1* | 10/2007 | Flynn | G06F 11/1662 |

(Continued)

FOREIGN PATENT DOCUMENTS

| | | |
|---|---|---|
| JP | 11-313073 | 11/1999 |
| JP | 2011-197847 | 10/2011 |
| JP | 2012-65015 | 3/2012 |

OTHER PUBLICATIONS

Patent Abstracts of Japan, Publication No. 2011-197847, published Oct. 6, 2011.

(Continued)

*Primary Examiner* — Abdullahi E Salad
(74) *Attorney, Agent, or Firm* — Staas & Halsey LLP

(57) ABSTRACT

An ascertainment device includes a processor that executes a process. The process includes: acquiring addresses of a plurality of respective data processing devices and virtual network identification data associated with the plurality of respective data processing devices; ascertaining the identification data for each of the plural data processing devices based on the acquired virtual network identification data and addresses, association data, stored in a storage section, of addresses and data processing devices, and association data, stored in the storage section, of virtual network identification data and data processing devices; and ascertaining as a data processing device group configured redundantly with respect to execution of specific processing, any data processing devices out of the plural data processing devices with the same virtual network identification data and the same address as each other associated with the identification data of the data processing devices.

15 Claims, 25 Drawing Sheets

(56) References Cited

U.S. PATENT DOCUMENTS

| | | | | |
|---|---|---|---|---|
| 2009/0287820 A1* | 11/2009 | Okazaki | .............. | H04L 12/2809 709/225 |
| 2011/0022882 A1* | 1/2011 | Jaehde | ................ | G06F 11/2023 714/4.1 |
| 2011/0078303 A1* | 3/2011 | Li | ........................... | G06F 9/505 709/224 |
| 2012/0278286 A1* | 11/2012 | Awazu | ................ | G06F 11/1451 707/649 |
| 2014/0161131 A1* | 6/2014 | Yang | ....................... | H04L 45/54 370/401 |

OTHER PUBLICATIONS

Patent Abstracts of Japan, Publication No. 11-313073, published Nov. 9, 1999.
Patent Abstracts of Japan, Publication No. 2012-65015, published Mar. 29, 2012.
Extended European Search Report dated Aug. 19, 2015 in corresponding European Patent Application No. 15156292.3.

\* cited by examiner

55A: SERVER MANAGEMENT TABLE

| IP ADDRESS | SERVER IDENTIFICATION DATA |
|---|---|
| 001 | 12 |
| 002 | 14 |
| ⋮ | ⋮ |
| 111 | 16 |

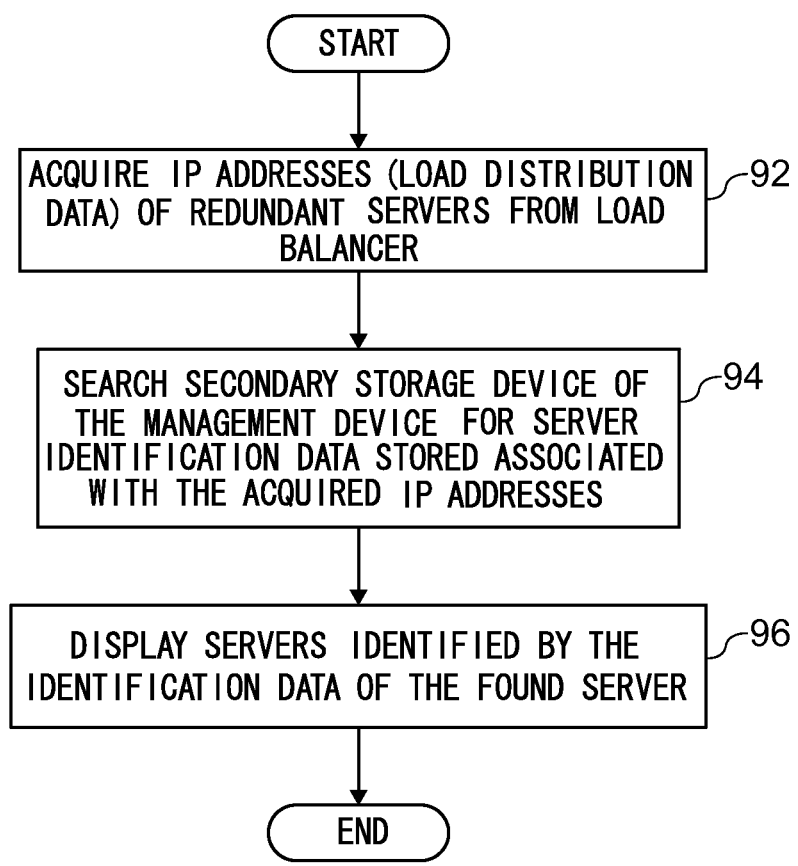

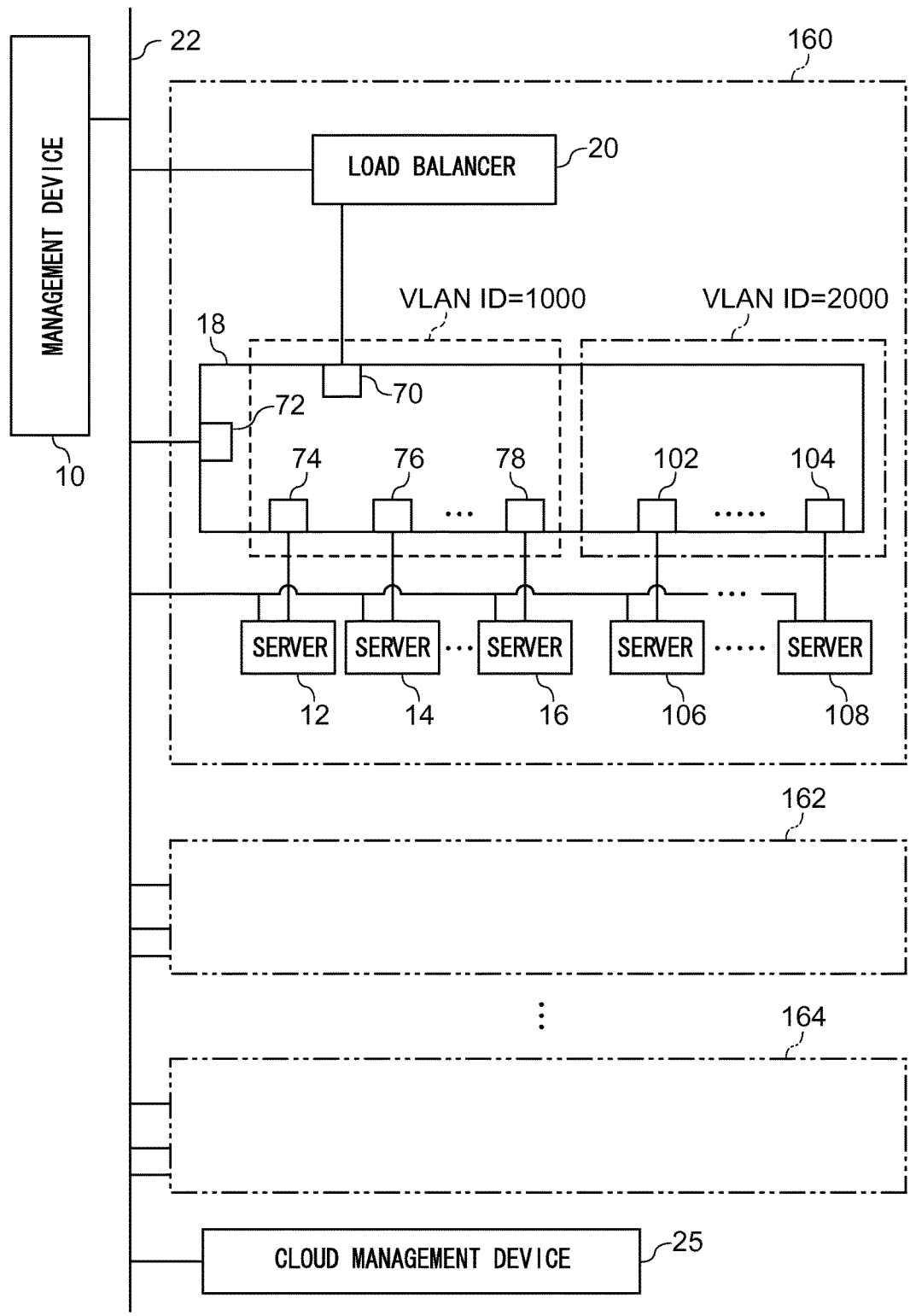

FIG.9A

53A: LOAD BALANCER MANAGEMENT TABLE

| SERVER SYSTEM IDENTIFICATION DATA | LOAD BALANCER IDENTIFICATION DATA | SWITCH IDENTIFICATION DATA |
|---|---|---|
| 1 | 20 | 18 |
| ⋮ | ⋮ | ⋮ |

FIG.9B

55B: SERVER MANAGEMENT TABLE

| SERVER IDENTIFICATION DATA | IP ADDRESS | RACK DATA |
|---|---|---|
| 12 | 001 | T1 |
| 14 | 002 | T2 |
| ⋮ | ⋮ | ⋮ |
| 16 | 111 | T3 |
| 106 | 201 | T4 |
| ⋮ | ⋮ | ⋮ |
| 108 | 211 | T5 |

FIG.10

57: PORT MANAGEMENT TABLE

| PORT | NETWORK IDENTIFIER (VLAN ID) | CONNECTION DESTINATION |
|---|---|---|
| 70 | 1000 | 20 |
| 72 | 1000 | 22 |
| 74 | 1000 | 12 |
| 76 | 1000 | 14 |
| ⋮ | ⋮ | ⋮ |
| 78 | 1000 | 16 |
| 102 | 2000 | 106 |
| ⋮ | ⋮ | ⋮ |
| 104 | 2000 | 108 |

FIG.16

53A:LOAD BALANCER MANAGEMENT TABLE

| SERVER SYSTEM IDENTIFICATION DATA | LOAD BALANCER IDENTIFICATION DATA | SWITCH IDENTIFICATION DATA |
|---|---|---|
| 1 | 20 | 18 |
| ⋮ | ⋮ | ⋮ |

FIG.17

55C:SERVER MANAGEMENT TABLE

| SERVER IDENTIFICATION DATA | IP ADDRESS | SWITCH | PORT | RACK DATA |
|---|---|---|---|---|
| 12 | 001 | 186 | 236 | T1 |
| 14 | 002 | 186 | 238 | T2 |
| ⋮ | ⋮ | ⋮ | ⋮ | ⋮ |
| 16 | 111 | 194 | 252 | T3 |
| 106 | 001 | 196 | 254 | T4 |
| ⋮ | ⋮ | ⋮ | ⋮ | ⋮ |
| 108 | 111 | 196 | 256 | T5 |

FIG.18A

182T: PORT MANAGEMENT TABLE

| PORT | VLAN ID | CONNECTION DESTINATION |
|---|---|---|
| 20 | 1000 | 20 |
| 20 | 1000 | 22 |
| 20 | 1000 | 186 |
| 20 | 1000 | 188 |
| 20 | 1000 | 190 |
| 22 | 1000 | 184 |

FIG.18B

184T: PORT MANAGEMENT TABLE

| PORT | VLAN ID | CONNECTION DESTINATION |
|---|---|---|
| 22 | 1000 | 182 |
| 22 | 1000 | 192 |
| 22 | 1000 | 194 |
| 22 | 2000 | 196 |

FIG.18C

186T: PORT MANAGEMENT TABLE

| PORT | VLAN ID | CONNECTION DESTINATION |
|---|---|---|
| 2 2 | 1 000 | 1 8 2 |
| 2 4 | 1 000 | 2 2 |
| 2 6 | 1 000 | 1 2 |
| 2 8 | 1 000 | 1 4 |
| ⋮ | ⋮ | ⋮ |

194T: PORT MANAGEMENT TABLE

| PORT | VLAN ID | CONNECTION DESTINATION |
|---|---|---|
| ⋮ | ⋮ | ⋮ |
| 2 2 | 1 000 | 1 6 |
| ⋮ | ⋮ | ⋮ |

FIG.18E

196T: PORT MANAGEMENT TABLE

| PORT | VLAN ID | CONNECTION DESTINATION |
|---|---|---|
| 2 4 | 2 000 | 1 0 6 |
| 2 6 | 2 000 | 1 0 8 |
| ⋮ | ⋮ | ⋮ |

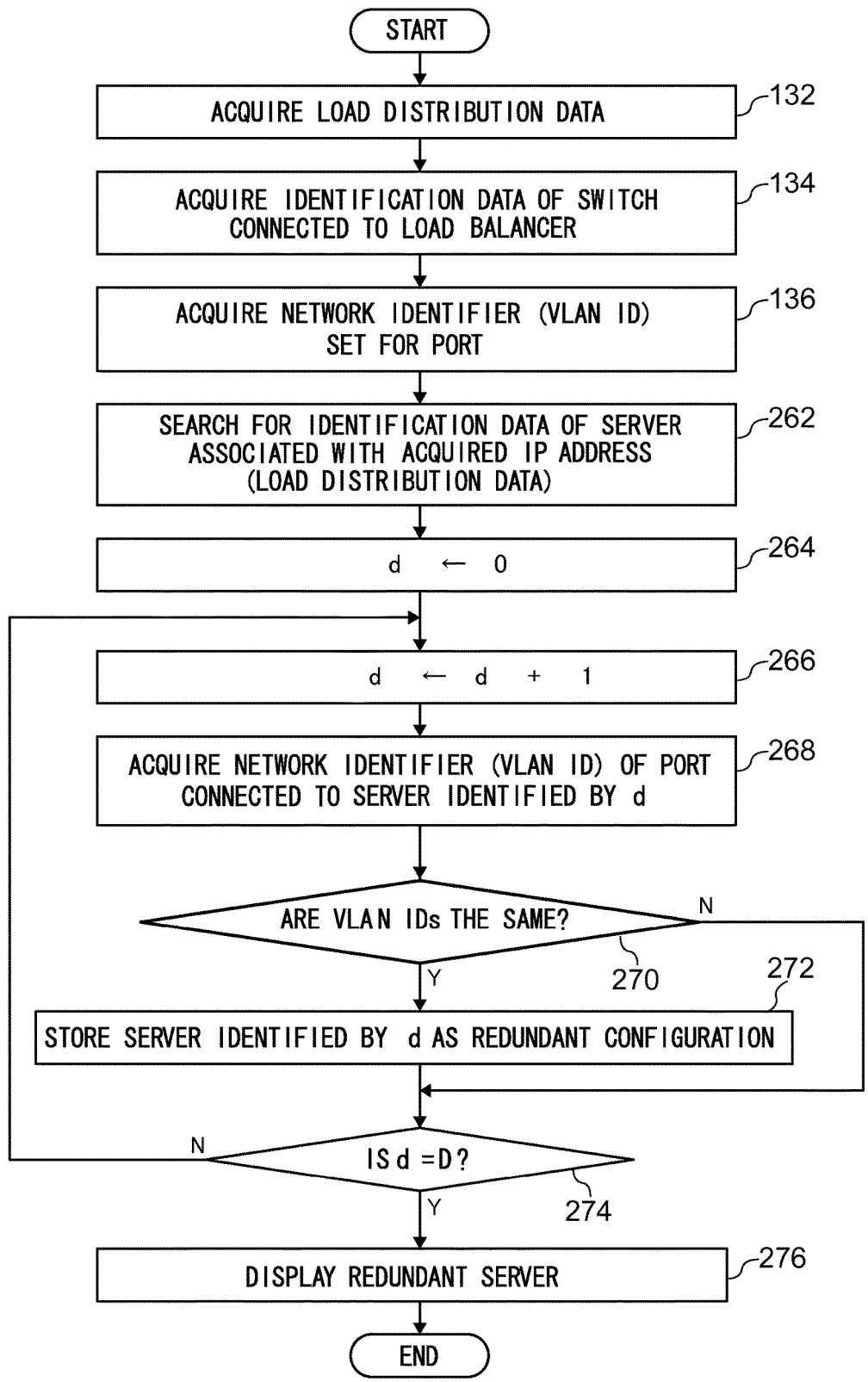

FIG.21

55D: SERVER MANAGEMENT TABLE

| IP ADDRESS | TARGET SERVER | HOUSING | TENANT DATA | |
|---|---|---|---|---|
| 192.168.1.100 | SERVER 201 | A | COMPANY X | ⌐506A1 |
| 192.168.1.101 | SERVER 302 | B | COMPANY X | |
| 192.168.1.102 | SERVER 304 | B | COMPANY X | |
| 192.168.1.100 | SERVER 202 | A | COMPANY Y | ⌐506A2 |
| 192.168.1.101 | SERVER 306 | B | COMPANY Y | |
| 192.168.2.100 | SERVER 204 | A | COMPANY Y | |
| 192.168.2.101 | SERVER 205 | A | COMPANY Y | |
| 192.168.1.100 | SERVER 301 | B | COMPANY Z | ⌐506A3 |

FIG.22

59: LOAD DISTRIBUTION DATA MANAGEMENT TABLE

| PROCESSING | TRANSMISSION DESTINATION IP ADDRESS | |
|---|---|---|
| APP-1 (m = 1) | 192.168.1.100 | ⌐506A |
| | 192.168.1.101 | ⌐506B |
| | 192.168.1.102 | ⌐506C |
| DB-1 (m = 2) | 192.168.1.100 | |
| | 192.168.1.101 | |
| WEB-1 (m = 3) | 192.168.2.100 | |
| | 192.168.2.101 | |
| | 192.168.1.100 | |

FIG.23

61: SERVER CONNECTION DESTINATION MANAGEMENT TABLE

| DEVICE | HOUSING | SWITCH | PORT |
|---|---|---|---|
| SERVER 201 | A | 401 | 211 |
| SERVER 202 | A | 401 | 212 |
| SERVER 203 | A | 401 | 213 |
| SERVER 204 | A | 401 | 214 |
| SERVER 205 | A | 401 | 215 |
| SERVER 206 | A | 401 | 216 |
| SERVER 301 | B | 402 | 311 |
| SERVER 302 | B | 402 | 312 |
| SERVER 303 | B | 402 | 313 |
| SERVER 304 | B | 402 | 314 |
| SERVER 305 | B | 402 | 315 |
| SERVER 306 | B | 402 | 316 |
| LOAD BALANCER |  | 400 | 411 |

FIG.24

63: SWITCH CONNECTION DESTINATION MANAGEMENT TABLE

| SWITCH NUMBER | PORT | CONNECTION DESTINATION |
|---|---|---|
| 401 | 211 | 201 |
|  | 212 | 202 |
|  | 213 | 203 |
|  | 214 | 204 |
|  | 215 | 205 |
|  | 216 | 206 |
|  | 217 | 402, 317 |
|  | 218 | 400, 413 |
|  | 219 | 22 |
|  | ⋮ |  |

FIG.25

65: PORT MANAGEMENT TABLE

| SWITCH | PORT | VLAN ID | Segment ID |
|---|---|---|---|
| 401 | 211 | 2500 | 3000 |
|  | 212 | 1500 | 3000 |
|  | 213 | 1500 | 3000 |
|  | 214 | 2500 | 3000 |
|  | 215 | 2500 | 3000 |
|  | 216 | 2500 | 3000 |
| 402 | 311 | 1500 | 3000 |
|  | 312 | 1500 | 3000 |
|  | 313 | 1500 | 3000 |
|  | 314 | 2500 | 3000 |
|  | 315 | 2500 | 3000 |
|  | 316 | 2500 | 3000 |
| 400 | 411 | 2500 | 3000 |
|  | 412 | 2500 | 3000 |
|  | 413 | 2500 | 3000 |
|  |  |  |  |

FIG.26

67: REDUNDANCY CONFIGURATION MANAGEMENT TABLE

| SERVER | HOUSING | REDUNDANT CONFIGURATION | | RELIABILITY |
|---|---|---|---|---|
| | | SERVER | HOUSING | |
| 201 | A | 304 | B | HIGH |
| | | 306 | B | |
| 202 | A | 306 | B | HIGH |
| 203 | A | 303 | B | HIGH |
| 204 | A | 205 | A | MEDIUM |
| 205 | A | 204 | A | MEDIUM |
| 206 | A | – | – | LOW |
| 301 | B | – | – | LOW |
| 302 | B | 201 | A | HIGH |
| | | 304 | B | |
| 303 | B | 203 | A | HIGH |
| 304 | B | 201 | A | HIGH |
| | | 302 | B | |
| 305 | B | – | – | LOW |

512 points to row 201.

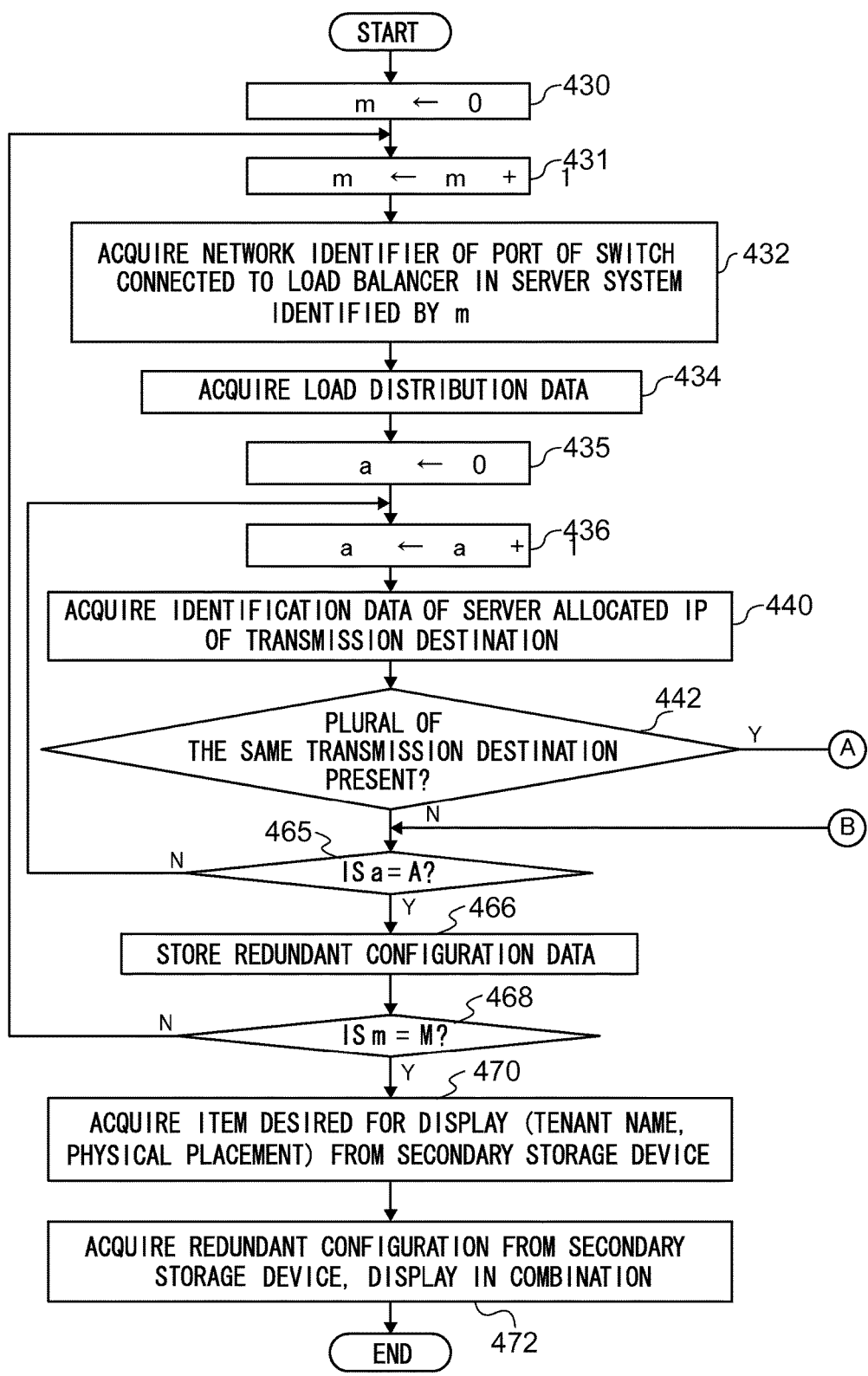

ASCERTAINMENT METHOD AND DEVICE

CROSS-REFERENCE TO RELATED APPLICATION

This application is based upon and claims the benefit of priority of the prior Japanese Patent Application No. 2014-062554, filed on Mar. 25, 2014, the entire contents of which are incorporated herein by reference.

FIELD

The embodiments discussed herein are related to a recording medium storing an ascertainment program, an ascertainment method, and an ascertainment device.

BACKGROUND

A conventional service provision system, as illustrated in FIG. 29, includes a load balancer 602, a switch 604 connected to the load balancer 602, and plural server devices 606 to 612 connected to the switch 604, each connected to a network 620. Server devices are referred to below as servers.

Each of the plural servers 606 to 612 are managed by a server provider (tenant provider side). The server provider provides a service provider (tenant usage side) intending to provide a service using servers with the number of individual servers designated by the service provider. For example, take the case in which a service provider has requested the server provider to provide two servers for providing a given service. The server provider selects two servers from out of the plural servers 606 to 612, and records the IP addresses of the selected two servers in the load balancer 602. When plural execution requests for a service that transmits home page data are received, for example, the load balancer 602 allocates each of the plural received requests to the two servers corresponding to the two recorded IP addresses. For example, the two IP addresses are, say, 001 and 111, and the IP address=001 corresponds to the server 606, and the IP address=111 corresponds to the server 612.

The load balancer 602 allocates each of the plural requests to either the IP address=001, or the IP address=111. The requests that have been allocated to either the IP address=001 or the IP address=111 are then allocated to either the server 606 or the server 612 through the switch 604. The server 606 and the server 612 transmit the home page data according to the allocated requests.

A configuration in which the same processing is executed on plural servers is referred to as a redundant configuration. Due to the processing being executed on the plural redundant servers in this manner, even if one of the plural redundant servers breaks down, the processing still continues on the remaining servers. This thereby enables the service outage percentage to be reduced.

A server provider performs maintenance on the servers so that the servers provided to the service provider do not break down. In the above example, since the server 606 and the server 612 are made redundant, even if the server 606 is shut down to perform maintenance on the server 606, the processing still continues on the remaining server 612. This thereby enables redundancy to be built into the plural servers, such that server maintenance can be performed without causing significant disruption to the business of the service provider.

RELATED PATENT DOCUMENTS

Japanese Laid-Open Patent Publication No. 2011-197847

SUMMARY

According to an aspect of the embodiments, an ascertainment device includes a processor that executes a procedure. The procedure includes: acquiring addresses of a plurality of respective data processing devices, and virtual network identification data that identifies each of a plurality of respective virtual networks virtually defined on a network, the virtual network identification data being associated with the plurality of respective data processing devices; ascertaining the identification data for each of the plural data processing devices based on the acquired virtual network identification data and addresses, association data, stored in a storage section, of addresses and data processing devices, and association data, stored in the storage section, of virtual network identification data and data processing devices; and ascertaining as a data processing device group configured redundantly with respect to execution of specific processing, any data processing devices out of the plural data processing devices with the same virtual network identification data and the same address as each other associated with the identification data of the data processing devices.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a flowchart illustrating an example of server identification data ascertainment processing of the first exemplary embodiment;

FIG. 8 is a block diagram illustrating a service provision system of a second exemplary embodiment;

FIG. 9A is a diagram illustrating a load balancer management table of the second exemplary embodiment;

FIG. 9B is a diagram illustrating a server management table of the second exemplary embodiment;

FIG. 10 is a diagram illustrating a port management table of the second exemplary embodiment;

FIG. 16 is a diagram illustrating a load balancer management table of the third exemplary embodiment;

FIG. 17 is a diagram illustrating a server management table of the third exemplary embodiment;

FIG. 18A is a diagram illustrating a port management table in a switch 182 of the third exemplary embodiment;

FIG. 18B is a diagram illustrating a port management table in a switch 184 of the third exemplary embodiment;

FIG. 18C is a diagram illustrating a port management table in a switch 186 of the third exemplary embodiment;

FIG. 18D is a diagram illustrating a port management table in a switch 194 of the third exemplary embodiment;

FIG. 18E is a diagram illustrating a port management table in a switch 196 of the third exemplary embodiment;

FIG. 19 is a flowchart illustrating an example of redundant configuration display processing of the third exemplary embodiment (at step 128 of FIG. 13);

FIG. 21 is a diagram illustrating a server management table of the fourth exemplary embodiment;

FIG. 22 is a diagram illustrating a load distribution data management table of the fourth exemplary embodiment;

FIG. 23 is a diagram illustrating a server connection destination management table of the fourth exemplary embodiment;

FIG. 24 is a diagram illustrating a switch connection destination management table of the fourth exemplary embodiment;

FIG. 25 is a diagram illustrating a port management table of the fourth exemplary embodiment;

FIG. 26 is a diagram illustrating a redundant configuration management table of the fourth exemplary embodiment;

FIG. 27A is a flowchart illustrating an example of a server identification data ascertainment processing of the fourth exemplary embodiment;

DESCRIPTION OF EMBODIMENTS

Detailed explanation follows regarding exemplary embodiments of the technology disclosed herein, with reference to the drawings.

First Exemplary Embodiment

Figure 1:
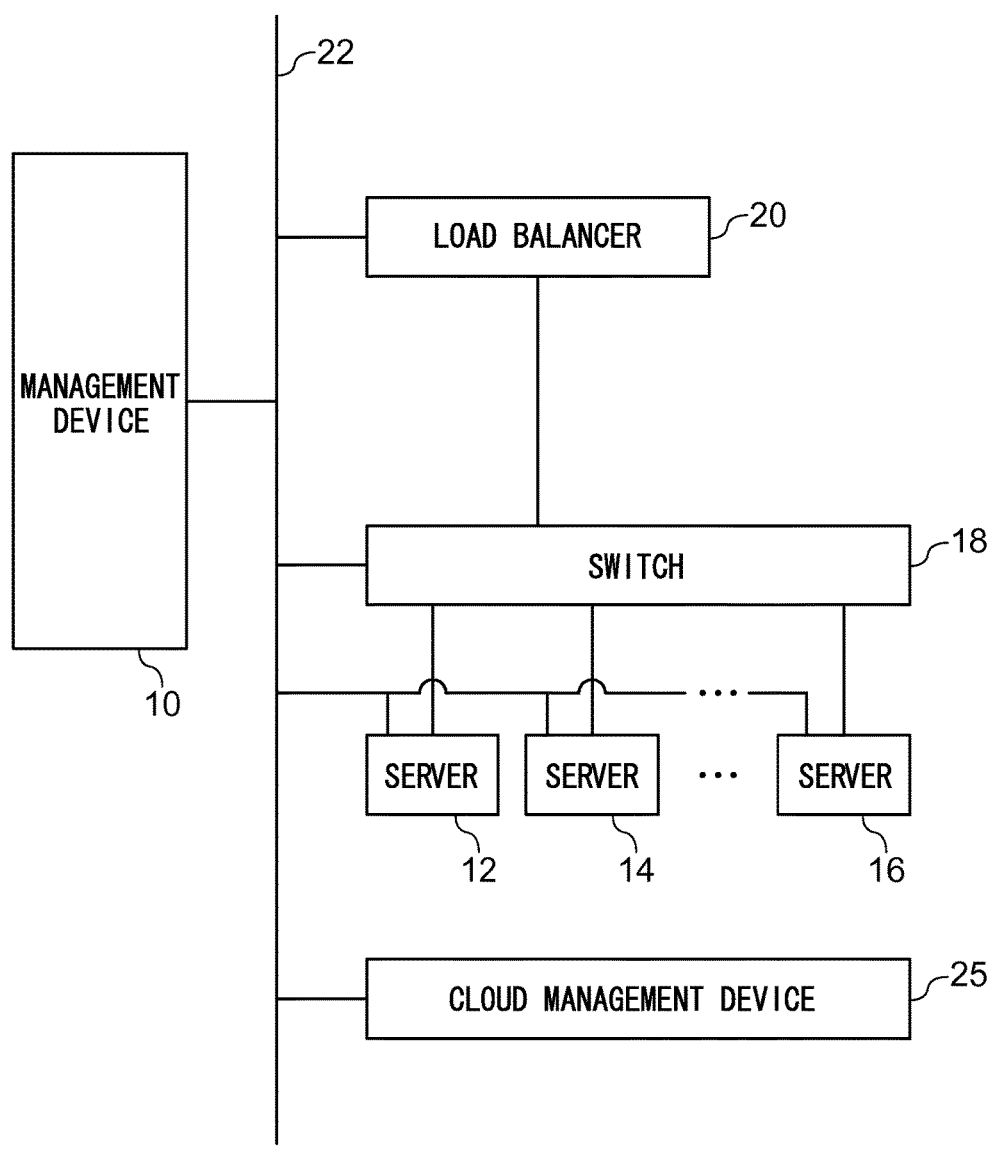
FIG. 1 is a block diagram illustrating a service provision system of a first exemplary embodiment.

FIG. 1 is a block diagram illustrating a service provision system of a first exemplary embodiment. As illustrated in FIG. 1, the service provision system of the first exemplary embodiment includes a load balancer 20, a switch 18 connected to the load balancer 20, and plural servers 12 to 16 connected to the switch 18. The service provision system of the first exemplary embodiment also includes a management device 10, and a cloud management device 25. Each of the devices 10, 12 to 16, 18, 20, 25 are connected to a network 22.

Figure 2:
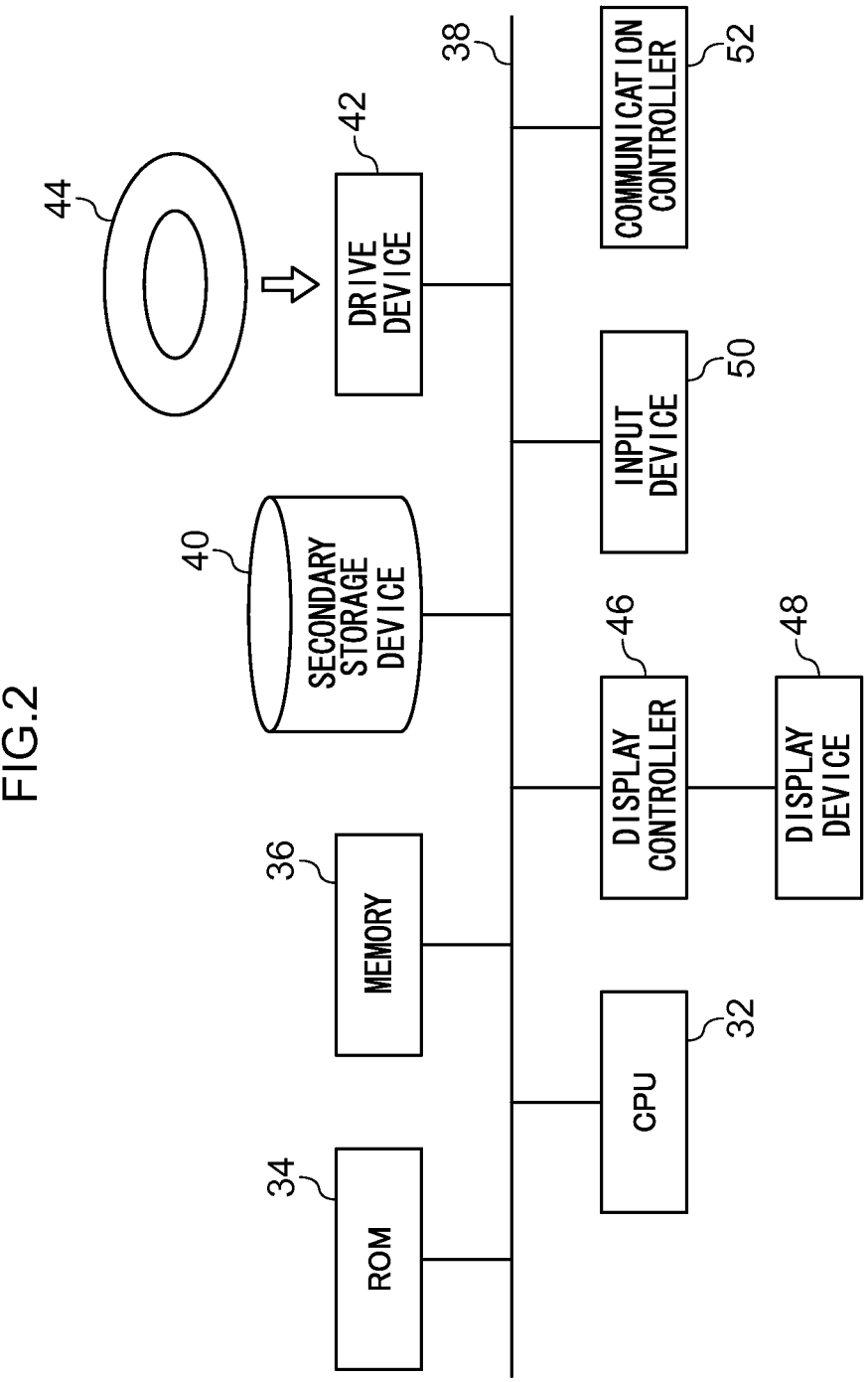
FIG. 2 is a block diagram of a management device of the first exemplary embodiment.

FIG. 2 is a block diagram of the management device 10. As illustrated in FIG. 2, the management device 10 includes a Central Processing Unit (CPU) 32, Read Only Memory (ROM) 34, and Random Access Memory (RAM) 36. The CPU 32, the ROM 34, and the memory 36 are mutually connected together through a bus 38. A secondary storage device 40 and a magnetic disk drive 42 are connected to the bus 38. A magnetic disk 44 is installed in the magnetic disk drive 42. The management device 10 includes a display controller 46, a display device 48 connected to the display controller 46, an input device 50, and a communication controller 52 connected to the network 22. The display controller 46, the input device 50, and the communication controller 52 are connected to the bus 38. A liquid crystal display (LCD), cathode-ray tube (CRT), an organic electroluminescence display (OELD), a plasma display panel (PDP), a field effect display (FED), or the like may be applied as the display device 48. A keyboard, a mouse, or the like may be applied as the input device 50.

Figures 3, 4:
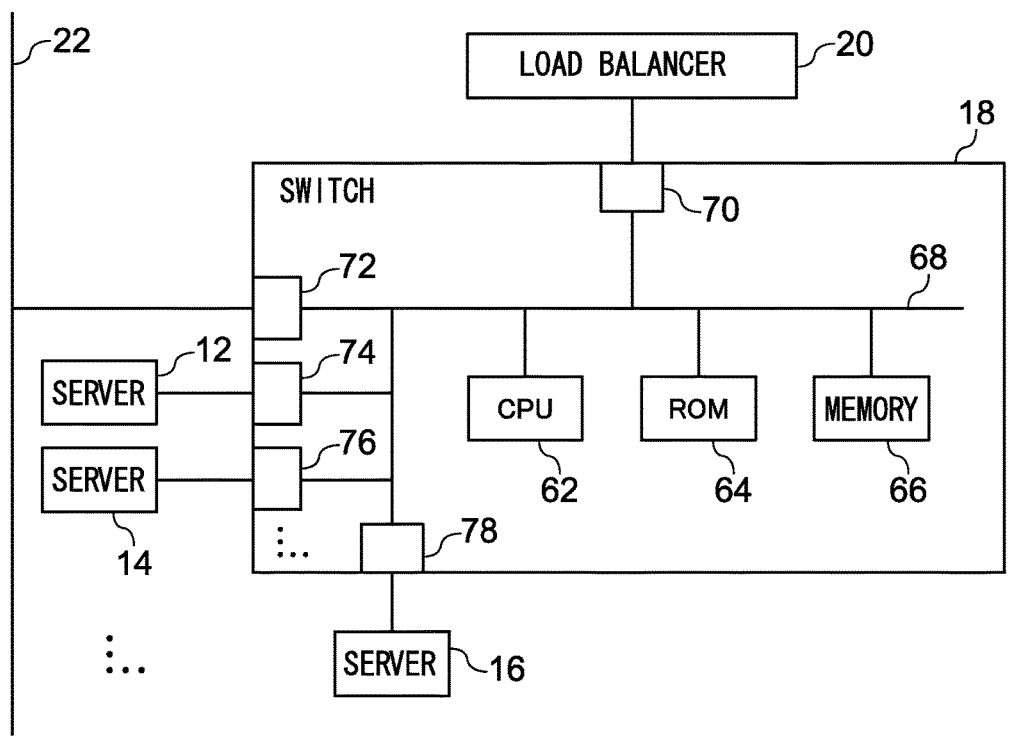
FIG. 3 is a diagram illustrating a server management table of the first exemplary embodiment.
FIG. 4 is a block diagram of a switch in the first exemplary embodiment.

FIG. 3 illustrates a server management table 55A stored on the secondary storage device 40 of the management device 10. As illustrated in FIG. 3, an IP address and server identification data are associated with each other and stored in the server management table 55A.

The configuration of the load balancer 20 and the cloud management device 25 is similar to that of the management device 10, and so explanation thereof is omitted.

FIG. 4 is a block diagram of a switch 18. As illustrated in FIG. 4, the switch 18 includes a CPU 62, ROM 64, and memory 66. The CPU 62, the ROM 64, and the memory 66 are connected to a bus 68. Plural ports 70 to 78 are connected to the bus 68. The load balancer 20 is connected to the port 70. The network 22 is connected to the port 72. The server 12 is connected to the port 74. The server 14 is connected to the port 76. The server 16 is connected to the port 78.

Figure 5:
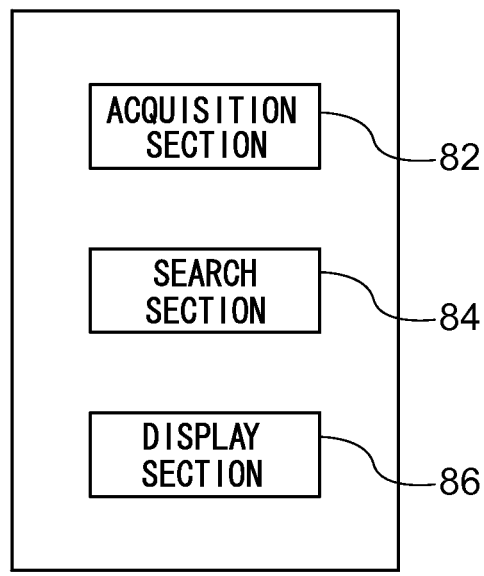
FIG. 5 is a diagram illustrating functional sections of a management device of the first exemplary embodiment.

FIG. 5 illustrates functional sections of the management device 10 of the first exemplary embodiment. As illustrated in FIG. 5, the management device 10 includes an acquisition section 82, a search section 84, and a display section 86.

The acquisition section 82 and the search section 84 are respectively examples of an acquisition section and an ascertainment section of the technology disclosed herein.

Figure 6:
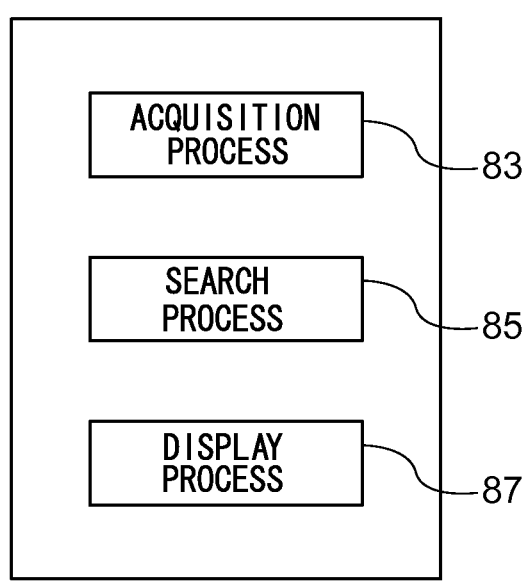
FIG. 6 is a diagram illustrating processes in a server identification data ascertainment program of the first exemplary embodiment.

FIG. 6 illustrates processes of a server identification data ascertainment program. As illustrated in FIG. 6, the server identification data ascertainment program includes an acquisition process 83, a search process 85, and a display process 87. The server identification data ascertainment program is stored on the ROM 34, read from the ROM 34 by the CPU 32, expanded into the memory 36, and executed.

An example is given here of a case in which the server identification data ascertainment program is read from the ROM 34, however the server identification data ascertainment program need not be stored in the ROM 34 initially. For example, the server identification data ascertainment program may be stored first on an appropriate "portable storage medium" employed connected to the management device 10, such as a Solid State Drive (SSD), a DVD disk, an IC card, a magneto-optical disk, or a CD-ROM. The management device 10 may then execute so as to acquire the server identification data ascertainment program from the portable storage medium. The server identification data ascertainment program may also be stored on a storage section such as another computer or server device connected to the management device 10 through a communication line.

In such cases the management device 10 executes to acquire the server identification data ascertainment program from the other computer or server device.

The CPU 32 operates as each of the sections 82 to 86 of FIG. 5 by executing each of the processes 83 to 87.

Explanation next follows regarding operation of the first exemplary embodiment.

Each of the plural servers 12 to 16 is managed by the cloud management device 25. To a service provider who utilizes servers to provide a service, the cloud management device 25 provides the number of servers designated by the service provider. For example, take the case in which a service provider requests provision of two servers from the cloud management device 25 in order to provide a service. The cloud management device 25 selects two servers from the plural servers 12 to 16, and records the IP addresses of the selected two servers in the load balancer 20 as transmission destination IP addresses (load distribution data) to which requests for the service provided by the service provider are to be transmitted. When plural execution requests are received, for example, each of plural received requests for a service that transmits home page data, the load balancer 20 allocates requests for the service provided by the service provider to the two servers corresponding to the two recorded IP addresses. For example for the two IP addresses 001 and 111, IP address=001 corresponds to the server 12, and IP address=111 corresponds to the server 16.

The load balancer 20 allocates each of the plural requests to either the IP address=001 or the IP address=111. The requests allocated to the IP address=001 or the IP address=111 are allocated to the server 12 or the server 16 through the switch 18. The server 12 and the server 16 transmit home page data according to the allocated requests. The server 12 and the server 16 are thereby made redundant. The load balancer 20 is able to discover the IP address of a redundant server from recorded load distribution data. However the load balancer 20 does not know which server corresponds to which IP address.

FIG. 7 illustrates a flowchart as an example of server identification data ascertainment processing of the first exemplary embodiment. At step 92 in FIG. 7, the acquisition section 82 acquires the IP addresses (load distribution data), 001, 111, of redundant servers from the load balancer 20.

At step 94, the search section 84 searches a server management table 55A stored in the secondary storage device 40 of the management device 10 for the IP addresses acquired at step 92, namely server identification data stored associated with 001, 111, i.e. 12, 16.

At step 96, the display section 86 controls the display controller 46 and displays the found server identification data, namely displays on the display device 48 the servers 12, 16 identified by 12, 16.

Explanation next follows regarding the advantageous effects of the first exemplary embodiment.

In the first exemplary embodiment, the identification data of each of the plural servers 12 to 16 and the IP addresses of each of the plural servers 12 to 16 are stored associated with each other in the server management table 55A. The IP addresses of the redundant servers are acquired from the load balancer 20, and server identification data associated with the acquired IP addresses is searched for in the server management table 55A. This thereby enables the redundant servers to be discovered.

Explanation follows regarding modified examples of the first exemplary embodiment.

First Modified Example

In the first exemplary embodiment, the server management table 55A, in which the identification data of the plural servers 12 to 16 are stored associated with the IP addresses of the plural servers 12 to 16 respectively, is stored in the secondary storage device 40 in the management device 10. In a first modified example, the server management table 55A is, for example, stored in the server 12. In the processing of step 94, the content of the server management table 55A is received from the server 12, such that the server identification data associated with the IP addresses acquired by the acquisition section 82 can be searched for in the received content.

Second Modified Example

In the first exemplary embodiment, the load balancer 20 is a device. In a second modified example, the load balancer 20 is a program installable on any device, for example on the server 12. This thereby enables allocation of requests by the server 12 executing the program. The second exemplary embodiment to the fourth exemplary embodiment, described below, are similar in this respect.

Second Exemplary Embodiment

FIG. 8 illustrates a service provision system of a second exemplary embodiment. As illustrated in FIG. 8, the service provision system of the second exemplary embodiment includes a management device 10, plural server systems 160, 162 to 164, and a cloud management device 25, that are connected to a network 22. Each of the plural server systems 160, 162 to 164 are configured similarly to each other, and so explanation follows of only the configuration of the server system 160. The server system 160 includes a load balancer 20, a switch 18 connected to the load balancer 20, and plural servers 12 to 16, 106 to 108 connected to the switch 18. Each of the above devices 12 to 16, 106 to 108, 18, 20 are connected to the network 22. Each of the above devices 10, 12 to 16, 106 to 108, 18, 20 are configured similarly to corresponding devices in the first exemplary embodiment, and so detailed explanation will be omitted thereof.

Plural ports 70, 72, 74 to 78, 102 to 104 are provided to the switch 18. The load balancer 20 and the network 22 are respectively connected to the ports 70, 72. The servers 12 to 16 are respectively connected to the ports 74 to 78. The servers 106 to 108 are respectively connected to the ports 102 to 104.

FIG. 9A illustrates a load balancer management table 53A stored in a secondary storage device 40 of the management device 10. Three types of identification data, a first to a third type, are associated and stored in the load balancer management table 53A. As the first type, identification data of the server systems 160, 162 to 164 is stored in the load balancer management table 53A. As the second type, identification data of the load balancer 20 in the server systems 160, 162 to 164 is stored in the load balancer management table 53A. As the third type, identification data of the switch 18 connected to the load balancer 20 is stored in the load balancer management table 53A.

FIG. 9B illustrates a server management table 55B for the server system 160 stored in the secondary storage device 40 of the management device 10. As illustrated in FIG. 9B, identification data of each of the servers 12 to 16, 106 to 108, and the IP addresses of the servers 12 to 16, 106 to 108 are associated with each other and stored in the server management table 55B. The identification data of the rack in which each of the servers 12 to 16, 106 to 108 is provided (rack data) is associated and stored in the server management table 55B. Server management tables for the server systems other than the server system 160, that is, server systems 162 to 164, are stored in secondary storage device 40 of the management device 10. Each of the server management tables for the server systems 162 to 164 are similar to the server management table 55B for the server system 160, and so explanation will be omitted thereof.

FIG. 10 illustrates a port management table 57 stored in a memory 66 of the switch 18 in the server system 160. The identification data for each of the ports 70, 72, 74 to 78, 102 to 104 of the switch 18 are stored in the port management table 57. Network identifiers (VLAN ID=1000, 2000) set for the ports 70, 72, 74 to 78, 102 to 104 are associated with the ports 70, 72, 74 to 78, 102 to 104 and stored in the port management table 57. The identification data of connection destination devices connected to the ports 70, 72, 74 to 78, 102 to 104 is associated with the ports 70, 72, 74 to 78, 102 to 104 respectively and stored in the port management table 57. For example, identification data=70 of the port 70, the network identifier (VLAN ID)=1000 set for the port 70, and the identification data=20 of the load balancer 20 that is the connection destination of the port 70 are stored associated with one another.

Explanation follows regarding the network identifier (VLAN ID). A Virtual Local Area Network (VLAN) refers to a virtual network, and VLAN ID is identification data of the virtual network. If a VLAN ID is set for a port, the switch 18 will only forward through that port, packet data corresponding to the VLAN ID set for that port. Thus each of the devices connected to ports set with the same VLAN ID form a virtual network that is independent of the physical network 22. The same VLAN ID=1000 is set for the ports 70, 74 to 78. As illustrated in FIG. 8, a first virtual network is thereby formed by the load balancer 20 and the servers 12 to 16. The same VLAN ID=2000 is set for the ports 102 to 104. As illustrated in FIG. 8, a second virtual network is thereby formed by the servers 106 to 108.

The first virtual network is accordingly formed by the servers 12 to 16, and the second virtual network is accordingly formed by the servers 106 to 108. For example, even if the IP addresses of each of the server 12 and the server 106 are the same as each other, the VLAN ID is set differently for the ports 74, 102 of the switch 18 to which the server 12 and the server 106 are connected. Accordingly, packet data will be received only by the server corresponding to the server 12 or the server 106.

Figure 11:
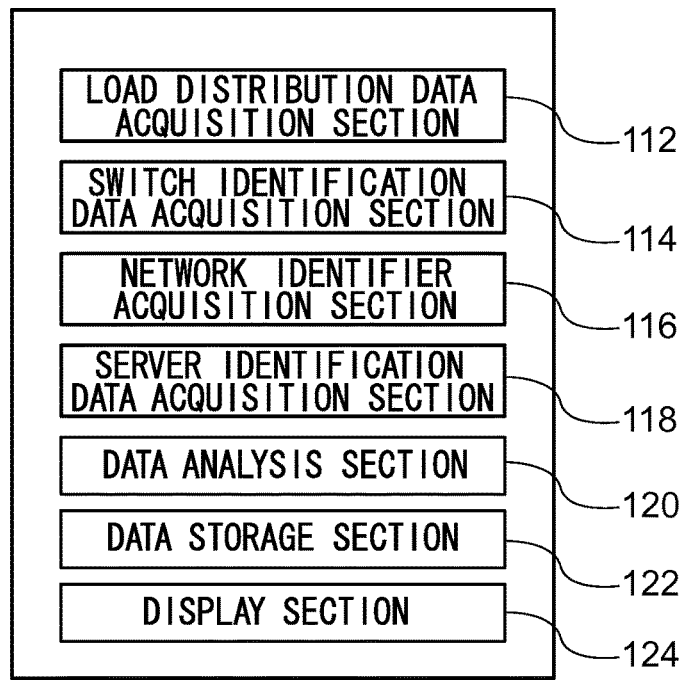
FIG. 11 is a diagram illustrating functional sections of a management device of the second exemplary embodiment.

FIG. 11 illustrates functional sections of the management device 10 of the second exemplary embodiment. As illustrated in FIG. 11, the management device 10 includes a load distribution data acquisition section 112, a switch identification data acquisition section 114, a network identifier acquisition section 116, a server identification data acquisition section 118, a data analysis section 120, a data storage section 122, and a display section 124.

Figure 12:
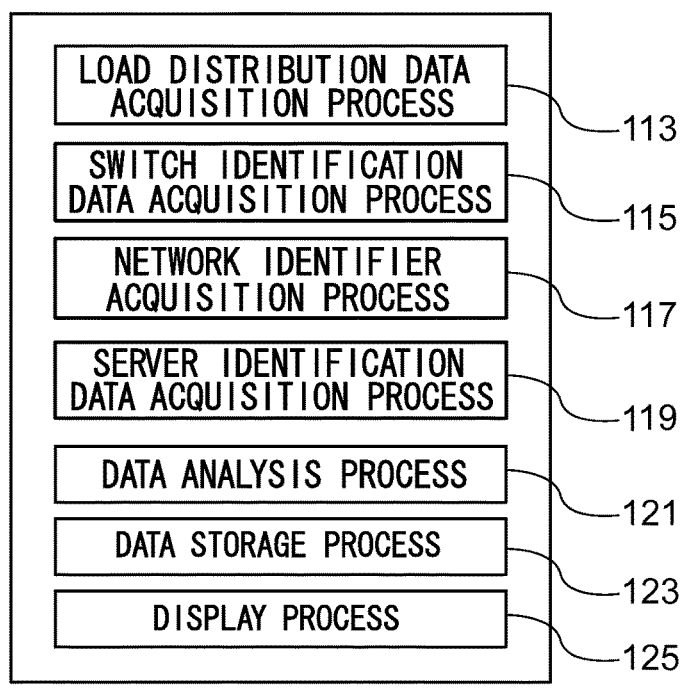
FIG. 12 is a diagram illustrating processes in a server identification data ascertainment program of the second exemplary embodiment.

FIG. 12 illustrates processes in a server identification data ascertainment program of the second exemplary embodiment. The server identification data ascertainment program includes a load distribution data acquisition process 113, a switch identification data acquisition process 115, a network identifier acquisition process 117, and a server identification data acquisition process 119. The server identification data ascertainment program also includes a data analysis process 121, a data storage process 123, and a display process 125. The CPU 32 operates as each of the sections 112 to 124 of FIG. 1 by executing each of the processes 113 to 125.

Explanation next follows regarding operation of the second exemplary embodiment.

Figure 13:
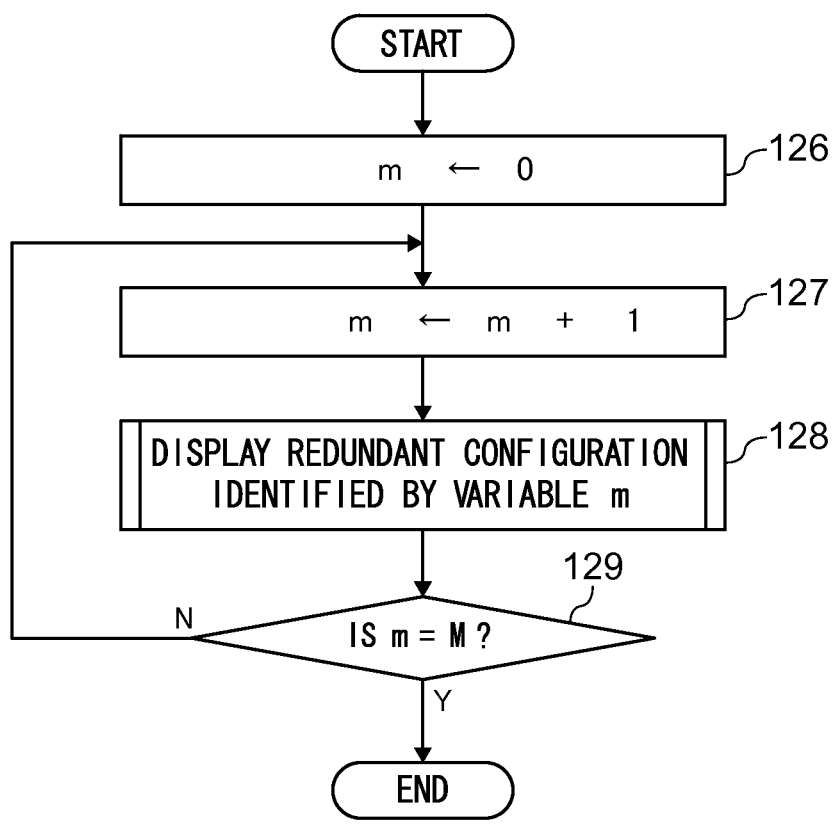
FIG. 13 is a flowchart illustrating an example of server identification data ascertainment processing of the second exemplary embodiment.

FIG. 13 illustrates a flowchart of an example of server identification data ascertainment processing of the second exemplary embodiment. At step 126 of FIG. 13, the data analysis section 120 initializes to 0 a variable m for identifying each of the plural server systems 160, 162 to 164, then at step 127 the data analysis section 120 increments the variable m by 1. At step 128, redundant configuration display processing is executed to display the redundant configuration of a server system identified by the variable m, described in detail later. At step 129, the data analysis section 120 determines whether or not the variable m is the same as a total number M of the plural server systems 160, 162 to 164.

When the determination result of step 129 is negative determination, since there is a server system for which the redundant configuration display processing has not been performed, the server identification data ascertainment processing returns to step 127. When the determination result of step 129 is affirmative determination, the redundant configuration display processing has been executed for all of the server systems, and so the server identification data ascertainment processing is ended.

Figure 14:
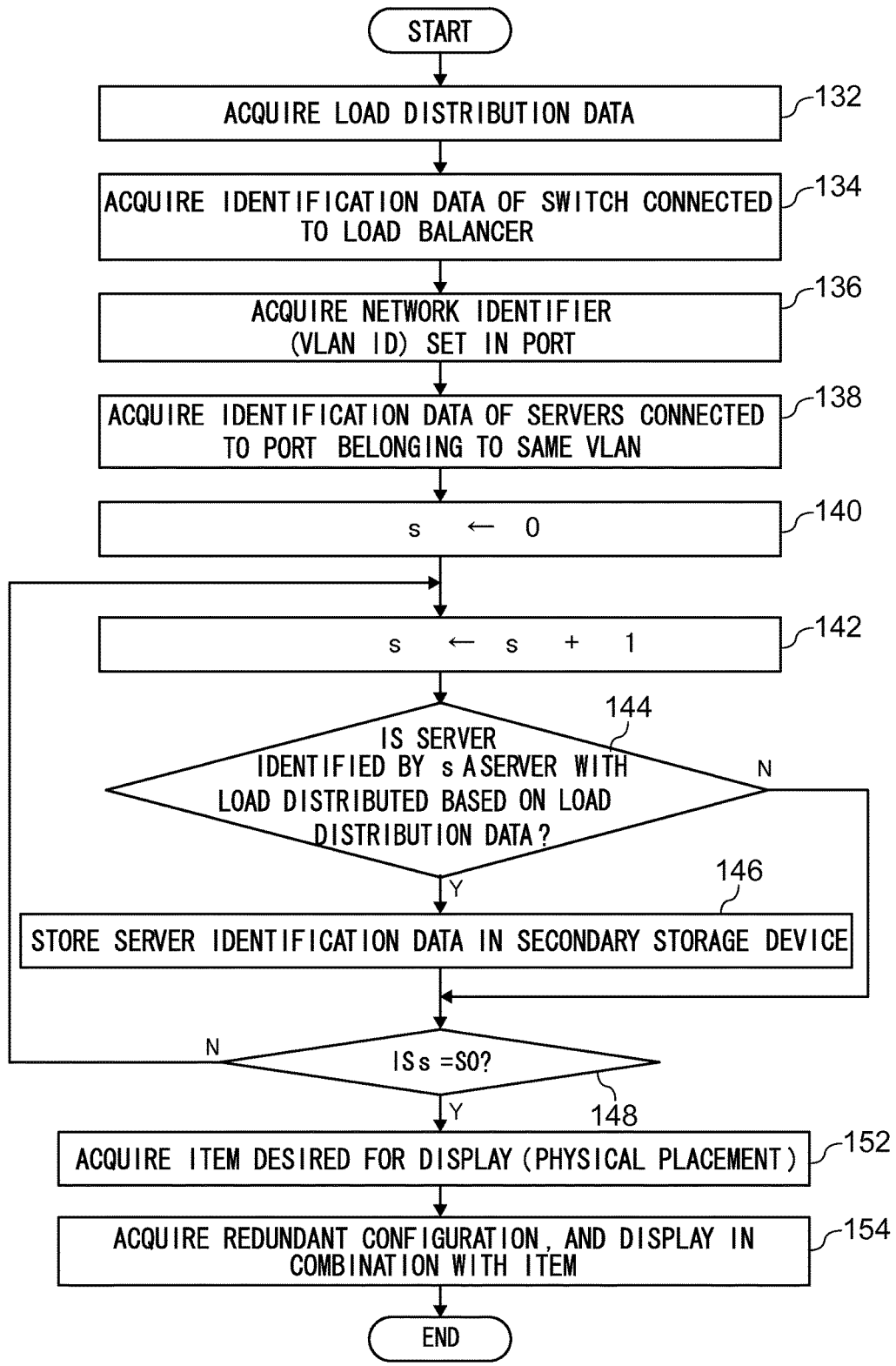
FIG. 14 is a flowchart illustrating an example of redundant configuration display processing of step 128 of FIG. 13.

FIG. 14 illustrates a flowchart of an example of redundant configuration display processing of step 128 of FIG. 13. At step 132 of FIG. 14, the load distribution data acquisition section 112 references the load balancer management table 53A (FIG. 9A), and ascertains the load balancer in the server system identified by the variable m. The load distribution data acquisition section 112 then acquires the IP addresses that are load distribution data from the ascertained load balancer 20. For example, 001, 111 are acquired as IP addresses. At step 134, the switch identification data acquisition section 114 references the load balancer management table 53A (FIG. 9A), and acquires the identification data of the switch 18 connected to the load balancer 20 for the server system identified by the variable m.

The processing of step 132 is an example of processing of the acquisition section of the technology disclosed herein.

At step 136, the network identifier acquisition section 116 acquires, from the switch 18 identified by the identification data acquired at step 134, the network identifier set for the port connected to the load balancer 20 in the server system identified by the variable m. More precisely, the network identifier acquisition section 116 instructs the switch 18 identified by the identification data acquired at step 134 to transmit the network identifier set for the port connected to the load balancer 20 in the server system identified by the variable m. The switch 18 references the port management table 57 (FIG. 10), identifies the port 70 connected to the load balancer 20, and reads the network identifier (VLAN ID=1000) stored associated with the port 70. The switch 18 transmits the acquired VLAN ID=1000 to the management device 10. The network identifier acquisition section 116 acquires the network identifier (VLAN ID=1000) set for the port connected to the load balancer 20 in the server system identified by the variable m by receiving the VLAN ID=1000.

At step 138, the server identification data acquisition section 118 acquires identification data of servers connected to ports assigned the same VLAN as the VLAN identified by the network identifier (VLAN ID=1000) acquired at step 136. More precisely, the server identification data acquisition section 118 instructs the switch 18 identified by the identification data acquired at step 134 in the following manner. Namely, the server identification data acquisition section 118 instructs the transmission of the identification data of servers connected to ports assigned the same VLAN as the VLAN identified by the network identifier (VLAN ID=1000) acquired at step 136. The switch 18 references the port management table 57 (FIG. 10), and reads the identification data (12, 14 to 16) of the server (connection destination) stored associated with the identification data of the ports set with the VLAN ID=1000. The switch 18 transmits the read server identification data (12, 14 to 16) to the management device 10. The server identification data acquisition section 118 receives the server identification data (12, 14 to 16). The server identification data acquisition section 118 thereby acquires the identification data of servers connected to ports assigned the same VLAN as the VLAN identified by the network identifier (VLAN ID=1000) acquired at step 136.

At step 140, the data analysis section 120 initializes a variable s for identifying the identification data of the servers acquired at step 138, and at step 142 the data analysis section 120 increments the variable s. At step 144, the data analysis section 120 determines whether or not the server identified by the server identification data identified by the variable s is a server in which load has been distributed based on load distribution data. More precisely, the data analysis section 120 references the server management table 55B (FIG. 9B) and reads the IP address associated with the server identification data identified by the variable s. The data analysis section 120 determines whether or not the read IP address is the same as any of the IP addresses that are the load distribution data acquired at step 132.

When the server identification data identified by the variable s is 12, the IP address=001 is stored in the server management table 55B (FIG. 9B) associated with the server identification data=12. When 001, 111 are acquired as the IP addresses that are the load distribution data at step 132 as described above, the IP address=001 associated with the server identification data=12 is the same as the IP address=001 acquired at step 132. The determination result of step 144 is accordingly affirmative determination.

In cases in which the determination result of step 144 is affirmative determination, the server identified by the server identification data identified by variable s is a redundant server. At step 146, the data storage section 122 stores the server identification data identified by the variable s in a redundant configuration recording region in a secondary storage device 40, not illustrated in the drawings. The redundant configuration display processing then proceeds to step 148.

However, when the server identification data identified by the variable s is 14, the IP address=002 is stored in the server management table 55B (FIG. 9B) associated with the server identification data=14. When 001, 111 are acquired as the IP addresses at step 132 as described above, the IP address=002 associated with the server identification data=14 is different from the IP address acquired at step 132. The determination result of step 144 is accordingly negative determination.

When the determination result of step 144 is negative determination, the server identified by the server identification data identified by the variable s is not a redundant server, and so step 146 is skipped, and the redundant configuration display processing proceeds to step 148.

At step 148, the data analysis section 120 determines whether or not the variable s is the same as a total number S0 of the identification data of servers acquired at step 138. When the determination result of step 148 is negative determination, there is still identification data of a server for which determination has not yet been made as to whether or not the server identified by the server identification data is a redundant server, and so the redundant configuration display processing returns to step 142.

However, when the determination result of step 148 is affirmative determination, determination has been made for all the server identification data as to whether or not the server identified by the server identification data is a redundant server, and so the redundant configuration display processing proceeds to step 152.

At step 152, the display section 124 acquires an item for display (physical placement), for example, the rack data. At step 154, the display section 124 acquires identification data of a redundant server stored in the redundant configuration recording region in the secondary storage device 40, not illustrated in the drawings, and displays this in combination with the corresponding rack. More precisely, the display section 124 references the server management table 55B (FIG. 9B) and acquires rack data associated with the identification data of the redundant server stored in the redundant configuration recording region. The display section 124 displays the racks in which the servers 12 to 16, 106 to 108 are provided, and prominently displays the redundant server at the position of the rack identified by the acquired rack data.

The processing of steps 134 to 146 is an example of processing of an ascertainment section in the technology disclosed herein.

Explanation follows regarding advantageous effects of the second exemplary embodiment.

As described above, servers are not redundant with each other if the VLANs thereof are different, even if the IP addresses thereof are the same. There is accordingly a need to discriminate therebetween. In the second exemplary embodiment, in association with the respective identification data of the servers, firstly the IP address is stored in the server management table 55B (FIG. 9B), and secondly the network identifier is stored in the port management table 57 (FIG. 10). The switch identification data acquisition section 114 acquires the IP addresses of the redundant servers from the load balancer 20. The switch identification data acquisition section 114 acquires the network identifier set for the port 70 of the switch 18 connected to the load balancer 20. The management device 10 acquires the server identification data associated with each of the IP addresses of the acquired redundant servers and the network identifiers from the server management table 55B (FIG. 9) and the port management table 57 (FIG. 10). This thereby enables the redundant servers to be discovered.

Explanation follows regarding a modified example of the second exemplary embodiment.

In the second exemplary embodiment, the server management table 55B (FIG. 9) is provided in the secondary storage device 40 of the management device 10, and the port management table 57 (FIG. 10) is provided in the memory 66 of the switch 18. In a modified example, the server management table 55B (FIG. 9B) and the port management table 57 (FIG. 10) may be provided in the secondary storage device 40 of the management device 10.

Third Exemplary Embodiment

Figure 15:
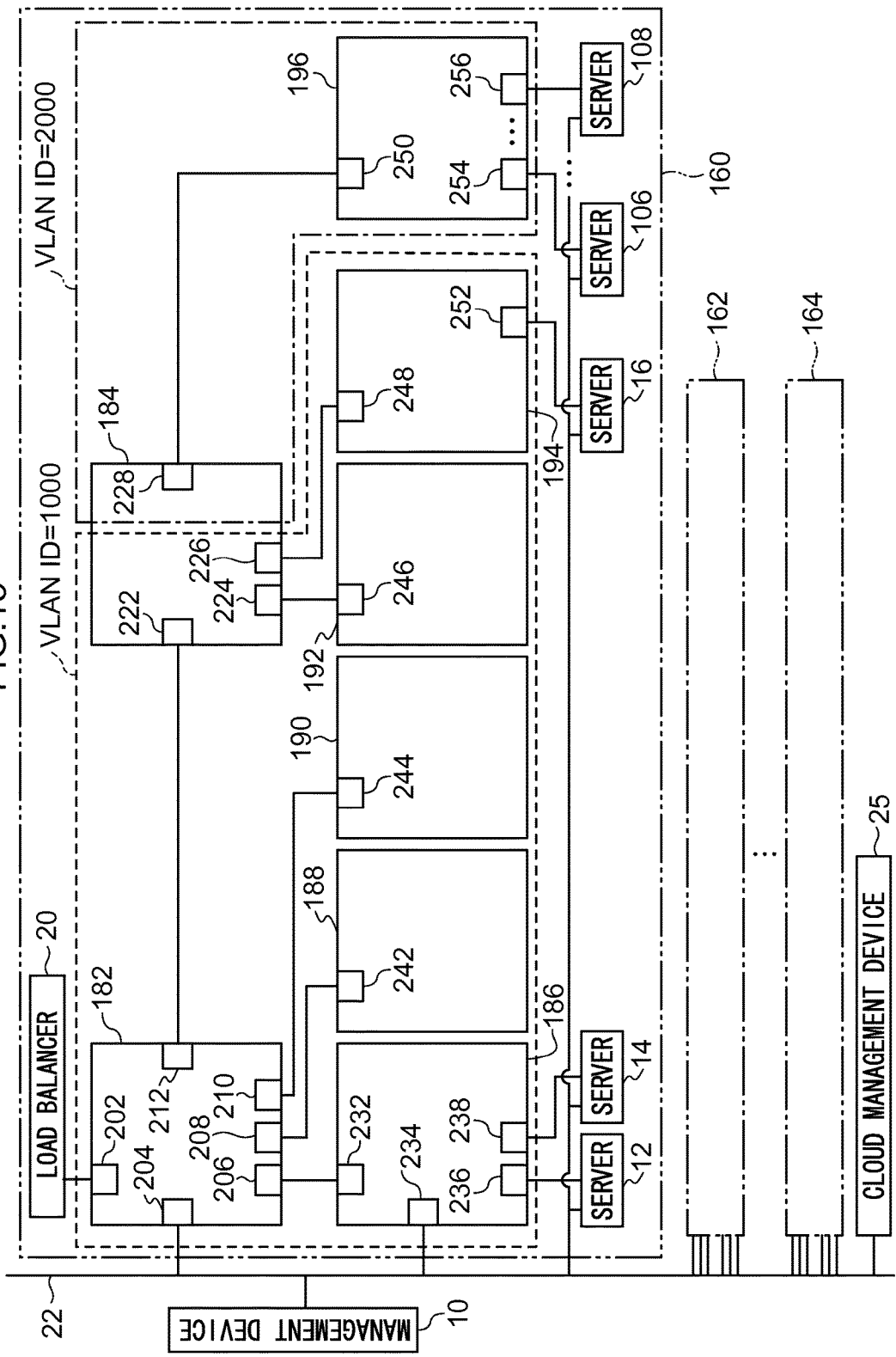
FIG. 15 is a block diagram illustrating a service provision system of a third exemplary embodiment.

FIG. 15 illustrates a service provision system of a third exemplary embodiment. Since the configuration of the service provision system of the third exemplary embodiment (FIG. 15) is similar to the configuration of the service provision system of the second exemplary embodiment (FIG. 8), the same reference numerals are appended to similar portions, and explanation will be given of portions that differ.

In the service provision system of the second exemplary embodiment illustrated in FIG. 8, the load balancer 20 and the plural servers 12 to 16, 106 to 108 are connected together through the single switch 18. In contrast thereto, in the service provision system of the third exemplary embodiment illustrated in FIG. 15, the load balancer 20 and the plural servers 12 to 16, 106 to 108 are connected together through plural switches 182 to 196. Namely, the servers 12, 14 are connected to the load balancer 20 through the switches 186, 182. The server 16 is connected to the load balancer 20 through the switches 194, 184, 182. The servers 106, 108 are connected to the load balancer 20 through the switches 196, 184, 182.

FIG. 16 illustrates a load balancer management table 53A stored in a secondary storage device 40 of a management device 10. The load balancer management table 53A is similar to that of FIG. 9A, and so explanation will be omitted thereof.

FIG. 17 illustrates a server management table 55C corresponding to the server system 160 stored in the secondary storage device 40 of the management device 10. The identification data of each of the servers 12 to 16, 106 to 108, the IP addresses of each of the servers 12 to 16, 106 to 108, and the identification data of the ports and the switches connected to each of the servers 12 to 16, 106 to 108 are associated with each other and stored in the server management table 55C. The rack data associated with the identification data of each of the servers 12 to 16, 106 to 108 are also stored in the server management table 55C. For example, identification data=12 of the server 12, IP address=001 of the server 12, identification data=186 of the switch 186 to which the server 12 is connected, and identification data=236 of the port 236 to which the server 12 is connected in the switch 186, are stored associated with each other. Rack data=T1 of the rack in which the server 12 is placed is also stored associated with the identification data=12 of the server 12. Server management tables corresponding to server systems 162 to 164 other than the server system 160 are also stored in the secondary storage device 40 of the management device 10. Each of the server management tables for the other server systems 162 to 164 are similar to the server management table 55C in the server system 160, and so explanation will be omitted thereof.

FIG. 18A to FIG. 18E illustrates port management tables 182T to 196T of the respective switches 182 to 196. The respective port management tables 182T to 196T are stored with similar types of data, and explanation follows of only the port management table 182T stored in the memory 66 of the switch 182, illustrated in FIG. 18A. As illustrated in FIG. 18A, identification data of each of the ports 202 to 212 of the switch 182 is stored in the port management table 182T. The VLAN ID set in each of the ports 202 to 212 is stored in the port management table 182T associated with each of the ports 202 to 212. Moreover, the identification data of the connection destination device to which each of the ports 202 to 212 is connected are stored in the port management table 182T associated with the respective ports 202 to 212. For example, the identification data=202 of the port 202, the VLAN ID=1000 set for the port 202, and the identification data=20 of the load balancer 20 that is the connection destination of the port 202 are stored associated with one another.

Specific content of the functional sections and processes of a server identification data ascertainment program of the management device 10 of the third exemplary embodiment differ from the management device 10 in the second exemplary embodiment. However, the blocks of the functional sections and the processes of the server identification data ascertainment program of the management device 10 of the third exemplary embodiment are similar to the second exemplary embodiment, and so explanation will be omitted thereof.

Explanation next follows regarding operation of the third exemplary embodiment. Portions of the operation of the third exemplary embodiment are similar to the operation of the second exemplary embodiment, and so explanation will focus on portions that differ. The server identification data ascertainment processing of the second exemplary embodiment (see FIG. 13) is also executed in the third exemplary embodiment.

Redundant configuration display processing of step 128 of FIG. 13 differs between the third exemplary embodiment and the second exemplary embodiment. FIG. 19 illustrates a flowchart of an example of the redundant configuration display processing of the third exemplary embodiment. Steps 132 to 136 of FIG. 19 are similar to steps 132 to 136 of the redundant configuration display processing of the second exemplary embodiment (see FIG. 14) and so detailed explanation will be omitted thereof.

By execution of the processing of step 132, for example, 001, 111 are acquired as IP addresses (load distribution data) from the load balancer 20.

The processing of step 132 is an example of processing of the acquisition section of the technology disclosed herein.

By execution of the processing of step 134 and step 136, for example, the network identifier (VLAN ID=1000) set for the port 202 to which the load balancer 20 is connected in the server system identified by the variable m is acquired.

At step 262, the server identification data acquisition section 118 searches for server identification data associated with the IP addresses (load distribution data) acquired at step 132 in the server management table 55C (FIG. 17). As described above, when 001, 111 are acquired as the IP addresses (load distribution data), at step 262 the server identification data=12, 16, 106, 108 are acquired.

At step 264, the data analysis section 120 initializes to 0 a variable d that identifies the server identification data acquired at step 262, and at step 266, the data analysis section 120 increments the variable d by 1.

At step 268, the data analysis section 120 acquires the network identifier (VLAN ID) of the port to which the server is connected from the switch connected to the server identified by the identification data identified by the variable d. More precisely, the data analysis section 120 acquires the identification data of the switch and port associated with the identification data identified by the variable d in the server management table 55C (FIG. 17). The data analysis section 120 instructs the switch identified by the acquired switch identification data to transmit the VLAN ID set for the port identified by the acquired port identification data. The switch that has received the instruction then transmits to the management device 10 the VLAN ID set for the port from the port management table stored in the memory 66 of the switch. The network identifier (VLAN ID) of the port connected to the server identified by the variable d is acquired by receipt of the VLAN ID from the switch.

For example, take the case in which server identification data=12 is identified by the variable d. The identification data=186 of the switch, and the identification data=236 of the port associated with the identification data=12 are acquired from the server management table 55C (FIG. 17).

The data analysis section 120 instructs the switch 186 identified by the acquired switch identification data=186 to transmit the VLAN ID set for the port 236 identified by the acquired port identification data=236. The switch 186 that has received the instruction transmits to the management device 10 the VLAN ID=1000 set for the port 236 from the port management table 186T (FIG. 18C) stored in the memory 66 of the switch 186. By receiving the VLAN ID=1000 from the switch 186, the network identifier (VLAN ID=1000) of the port 236 to which the server 12 is connected is acquired.

At step 270, the data analysis section 120 determines whether or not the network identifier (VLAN ID) acquired at step 268 is the same as the network identifier (VLAN ID) acquired at step 136.

When the determination result of step 270 is affirmative determination, the server identified by the server identification data identified by the variable d is a redundant server. At step 272, the data storage section 122 stores the identification data of the server identified by the variable d in the redundant configuration recording region of the secondary storage device 40, not illustrated in the drawings. The redundant configuration display processing then proceeds to step 274.

However, when the determination result of step 27 is negative determination, the server identified by the server identification data identified by the variable d is not a redundant server, and so step 272 is skipped, and the redundant configuration display processing proceeds to step 274.

At step 274, the data analysis section 120 determines whether or not the variable d is the same as a total number D of server identification data items acquired at step 262. When the determination result of step 274 is negative determination, the servers identified by the server identification data includes identification data of a server for which determination as to whether that server is a redundant server has not yet been made, and so the redundant configuration display processing returns to step 266.

However, when the determination result of step 274 is affirmative determination, determination has been made for the identification data of all the servers as to whether or not the server identified by the server identification data is a redundant server, and so the redundant configuration display processing proceeds to step 276.

At step 276, the display section 124 controls the display controller 46 to display the redundant servers on the display device 48. The display section 124 acquires the rack data associated with the identification data of the redundant servers stored in the redundant configuration recording region. The display section 124 displays the racks in which the servers 12 to 16, 106 to 108 are placed, with the redundant servers prominently displayed at the positions on the rack identified by the acquired rack data.

The processing of steps 134 to 272 is an example of processing of the ascertainment section of the technology disclosed herein.

Explanation follows regarding advantageous effects of the third exemplary embodiment.

As described above, servers are not redundant with each other if the VLANs thereof are different, even if the IP addresses thereof are the same. There is accordingly a need to discriminate therebetween. In the third exemplary embodiment, in association with the respective identification data of the servers, firstly the IP address, and the identification data of the switches and ports are stored in the server management table 55C (FIG. 17), and secondly the network identifiers corresponding to each of the ports are stored in the respective port management tables (FIG. 18). The switch identification data acquisition section 114 acquires the IP addresses of redundant servers from the load balancer 20. The switch identification data acquisition section 114 acquires the network identifier set for the port 70 of the switch 18 connected to the load balancer 20. The management device 10 acquires from the server management table 55C and the port management table, the server identification data associated with each of the IP addresses of the acquired redundant servers and the network identifiers set for the ports of the switches connected to the load balancer 20. This thereby enables redundant servers to be discovered.

Explanation follows regarding differences between the operation of the second exemplary embodiment and the third exemplary embodiment.

In the second exemplary embodiment, firstly the network identifier acquisition section 116 acquires the identification data of the servers connected to the ports set with the network identifier (VLAN ID)=1000 set for the port 70 of the switch 18 to which the load balancer 20 is connected. Then secondly, the data analysis section 120 acquires server identification data associated with the IP addresses, this being the load distribution data, from out of the servers connected to the ports set with the network identifier (VLAN ID)=1000.

In contrast thereto, in the third exemplary embodiment, firstly the server identification data acquisition section 118 acquires the server identification data associated with the IP addresses, this being the load distribution data. Secondly, the data analysis section 120 acquires the servers connected to the ports set with the network identifier set for the port 70 of the switch 18 to which the load balancer 20 is connected from out of the server identification data associated with the IP addresses, this being the load distribution data.

Namely, in the second exemplary embodiment, the candidates for redundant servers are refined using the network identifier, and then the IP address that is the load distribution data in this sequence. In contrast thereto, the third exemplary embodiment differs in that the candidates for redundant servers are refined using the IP address that is the load distribution data, and then network identifier in this sequence.

Explanation next follows regarding a modified example of the third exemplary embodiment.

In the third exemplary embodiment, the server management table 55C (FIG. 17) is provided in the secondary storage device 40 of the management device 10, and the port management tables (FIG. 18) are provided in the memories 66 of the respective switches. In a modified example, the server management table 55C (FIG. 17) and the port management tables (FIG. 18) may be provided in the secondary storage device 40 of the management device 10.

Fourth Exemplary Embodiment

Figure 20:
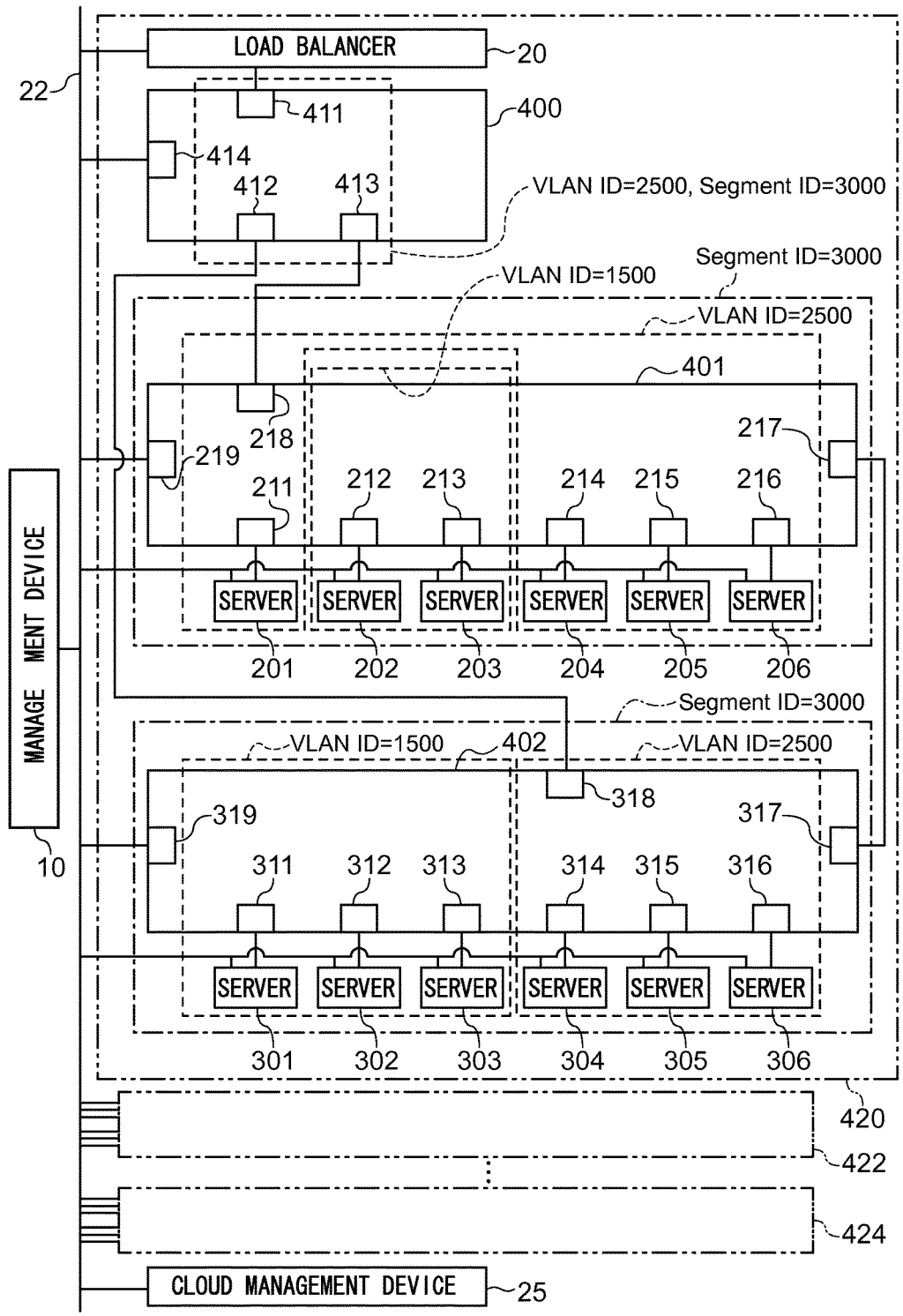
FIG. 20 is a block diagram illustrating a service provision system of a fourth exemplary embodiment.

FIG. 20 illustrates a service provision system of a fourth exemplary embodiment. As illustrated in FIG. 20, the service provision system of the fourth exemplary embodiment includes a management device 10, plural server systems 420, 422 to 424, and a cloud management device 25, each connected to the network 22. The plural server systems 420, 422 to 424 are configured similarly to one another, and so explanation follows regarding the configuration of the server system 420 alone. The server system 420 includes a load balancer 20. A switch 400 is connected to the load balancer 20. A switch 401 connected to plural servers 201 to 206 is connected to the switch 400. A switch 402 connected to plural servers 301 to 306 is connected to the switch 401.

The load balancer 20 is connected to a port 411 of the switch 400. Ports 412, 413 of the switch 400 are connected to the port 318 of the switch 402, and the port 218 of the switch 401 respectively. A port 414 of the switch 400 is connected to the network 22. VLAN ID=2500, and segment identification data Segment ID=3000 (details are given below) are set for the ports 411, 412, 413.

A port 219 of the switch 401 is connected to the network 22. The servers 201 to 206 are connected to the respective ports 211 to 216. A port 217 is connected to a port 317 of the switch 402. VLAN ID=2500 is set for the ports 211, 214 to 216. VLAN ID=1500 is set for the ports 212, 213. Segment ID=3000 is set for the ports 211 to 219.

The servers 301 to 306 are connected to the ports 311 to 316 of the switch 402. The port 318 is connected to the port 412 of the switch 400. The port 217 of the switch 401 is connected to the port 317. The port 319 is connected to the network 22.

VLAN ID=1500 is set for the ports 311 to 313. VLAN ID=2500 is set for the ports 314 to 316. Segment ID=3000 is set for the ports 311 to 319.

Herein, segment indicates a second order virtual network internally provided with at least one virtual network, and the Segment ID is identification data of the second order virtual network. For example, a first virtual network with VLAN ID=1500, and a second order virtual network with VLAN ID=2500, are provided within the second order virtual network (Segment ID=3000) of FIG. 20.

Explanation next follows regarding various tables stored on the secondary storage device 40 of the management device 10 (FIG. 21 to FIG. 26).

A server management table 55D of the fourth exemplary embodiment is illustrated in FIG. 21. The IP address, the target server, the housing in which the target server is provided, and tenant data for all of the servers included in the server systems 420 to 424 are identification data associated with each other and stored in the server management table 55D. The tenant is a company or the like that executes a service using the provided server.

FIG. 22 illustrates a load distribution data management table 59 of the fourth exemplary embodiment. Transmission destination IP addresses for requests, namely redundant server IP addresses, are stored in the load distribution data management table 59 associated with processing that distributes requests in each of the server systems. In order to simplify explanation, FIG. 22 illustrates an example in which there is one redundant configuration group in each of the server systems.

FIG. 23 illustrates a server connection destination management table 61 of the server system 420 of the fourth exemplary embodiment. The server connection destination management table 61 is stored with device identification data, identification data for the housing in which the device is provided, and identification data of switches and ports of the switches to which the device is connected. Server connection destination management tables of the server systems 422, 424 are also stored with similar types of identification data to the connection destination management table 61, and so explanation is omitted thereof.

FIG. 24 illustrates connection destination management table 63 for each switch of the fourth exemplary embodiment. For identification data of each of the switches, switch identification data, port identification data, and connection destination identification data are stored associated with one another in the switch connection destination management table 63.

FIG. 25 illustrates a port management table 65 for each switch of the fourth exemplary embodiment. Port identification data, VLAN ID, and Segment ID are associated with the identification data for each of the switches and stored in the port management table 65.

FIG. 26 illustrates a redundant configuration management table 67 of the server system 420 of the fourth exemplary embodiment. Server identification data, housing identification data, sever identification data and housing identification data of severs having redundant configurations, and reliability data are stored in the redundant configuration management table 67. Redundant configuration management tables 67 of the server systems 422, 424 are also stored with similar types of identification data to the identification data of the redundant configuration management table 67, and so explanation thereof is omitted.

Specific content of the functional sections and the processes of a server identification data ascertainment program of the management device 10 of the fourth exemplary embodiment is different from the management device 10 of the second exemplary embodiment. However, the blocks of the functional sections and the processes of the server identification data ascertainment program of the management device 10 of the fourth exemplary embodiment are similar to the second exemplary embodiment, and so explanation will be omitted thereof.

Explanation next follows regarding operation of the fourth exemplary embodiment.

Figure 27B:
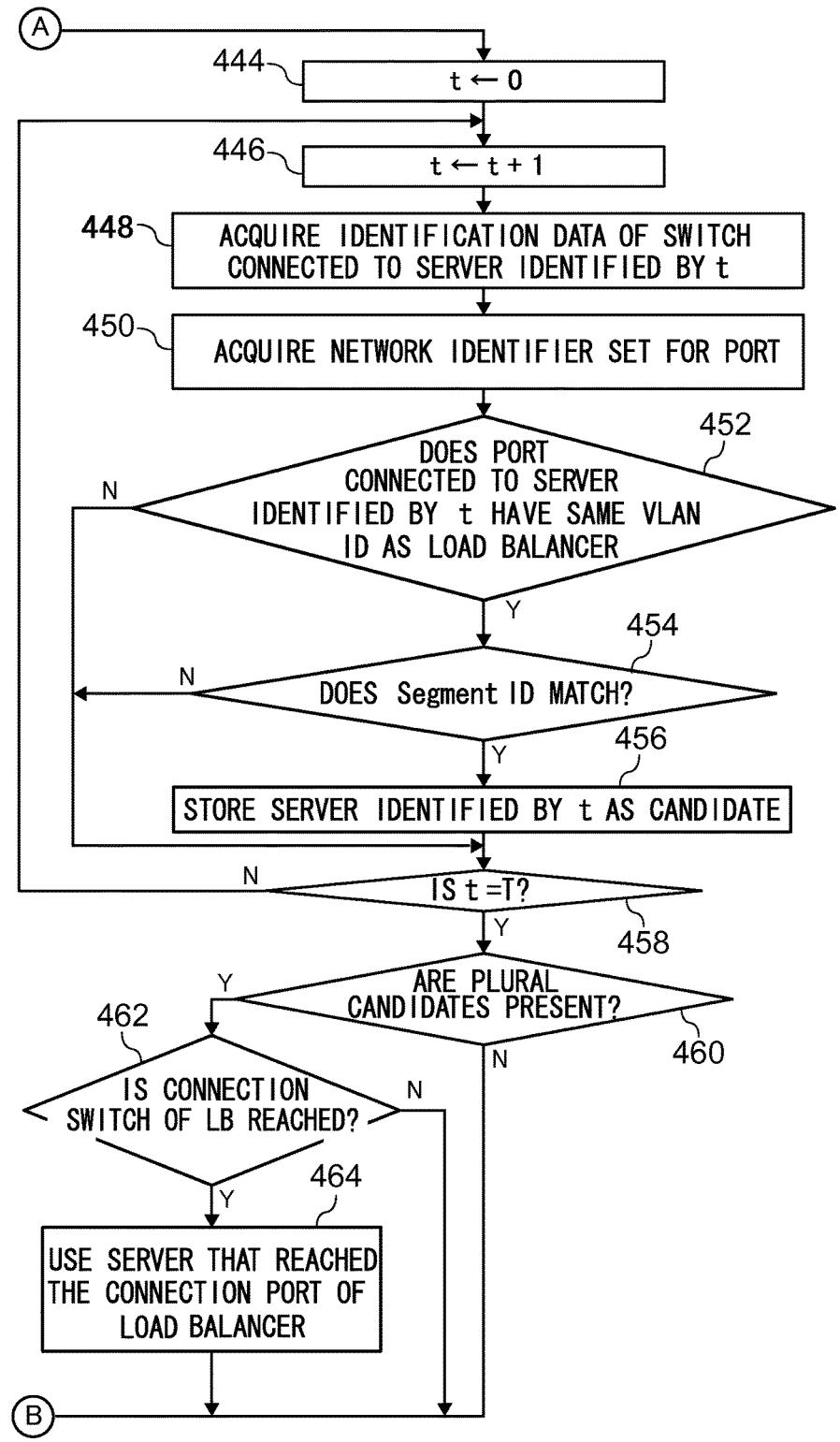
FIG. 27B is a flowchart illustrating an example of a server identification data ascertainment processing of the fourth exemplary embodiment.

FIG. 27 illustrates a flowchart of an example of server identification data ascertainment processing of the fourth exemplary embodiment. At step 430 of FIG. 27, the data analysis section 120 initializes to 0 a variable m identifying each of the server systems 401 to 424. At step 431 the data analysis section 120 increments the variable m by 1.

At step 432, the network identifier acquisition section 116 acquires a network identifier set for the port of the switch to which to the load balancer in the server system identified by the variable m is connected. More precisely, the network identifier acquisition section 116 references the connection destination management table 61 (see row 502 of FIG. 23), and reads the identification data of the switch (=400) and the identification data of the port (=411) to which the load balancer in the server system identified by the variable m is connected. The network identifier acquisition section 116 reads from the port management table 65 (see row 504 in FIG. 25) the VLAN ID (=2500) and the Segment ID (=3000) associated with the switch identification data (=400) and the port identification data (=411).

At step 434, the load distribution data acquisition section 112 reads from the load distribution data management table 59 (see rows 506A to 506C of FIG. 22) each of the transmission destination IP addresses in the server system identified by the variable m.

The processing of step 434 is an example of the processing of the acquisition section of the technology disclosed herein.

At step 435, the server identification data acquisition section 118 initializes to 0 a variable a that identifies the transmission destination IP addresses acquired at step 434. At step 436, the server identification data acquisition section 118 increments the variable a by 1. At step 440, the server identification data acquisition section 118 acquires from the server management table 55D (FIG. 21) the identification data of servers allocated the transmission destination IP address identified by the variable a. More precisely, the initial transmission destination IP address=192.168.1.100 is identified by the variable a when m=1. The server identification data acquisition section 118 acquires from the server management table 55D (FIG. 21) server identification data associated with the IP address=192.168.1.100. Namely, the server identification data=201, 202, 301 is acquired as illustrated in rows 506A1, 506A2, 506A3 of FIG. 21. The server management table 55D (FIG. 21) includes data of all severs of the server systems 420 to 424.

At step 442, the data analysis section 120 determines whether or not there are plural of the same transmission destination present. The determination result of step 442 is affirmative determination when, as described above, the server identification data=201, 202, 301 associated with the IP address=192.168.1.100 are acquired. The server identification data ascertainment processing proceeds to step 444 in such cases. The server identification data ascertainment processing proceeds to step 465 when the determination result of step 442 is negative determination.

At step 444, the data analysis section 120 initializes to 0 a variable t identifying each of the plural server identification data (201, 202, 301) associated with the same transmission destination (IP address=192.168.1.100). At step 446, the data analysis section 120 increments the variable t by 1.

At step 448, the switch identification data acquisition section 114 acquires from the connection destination management table 61 (row 508T1 of FIG. 23) identification data (401) of the switch 401 and the identification data of the port (211) connected to the server identified by the variable t (for example the server 201).

At step 450, the network identifier acquisition section 116 acquires from the port management table 65 (row 508P1 of FIG. 25) a network identifier associated with the identification data (=401) of the switch 401 and the port identification data (=211) acquired at step 448.

Namely, the network identifier acquisition section 116 acquires the VLAN ID (=2500) and the Segment ID (=3000).

At step 452, the data analysis section 120 determines whether or not the VLAN ID acquired at step 432 is the same as the VLAN ID acquired at step 450. When the determination result of step 450 is negative determination, since the server identified by the variable t is not a redundant server, the processing of steps 454, 456, described below, is skipped. When the determination result of step 452 is affirmative determination, then at step 454 the data analysis section 120 determines whether or not the Segment ID acquired at step 432 is the same as the Segment ID acquired at step 450. When the determination result of step 454 is negative determination, the server identified by the variable t is not a redundant server, and so processing of step 456, described below, is skipped.

When the determination results of step 452 and step 454 are affirmative determinations, the server identified by the variable t may be determined to be a candidate for a redundant server. At step 456, the data storage section 122 stores the server identification data identified by the variable t in a candidate data storage region, not illustrated in the drawings, in the secondary storage device 40 of the management device 10 as a redundant server candidate in the server system identified by the variable m.

At the next step 458, the data analysis section 120 determines whether or not the variable t is the same as a total number T of the server identification data (201, 202, 301) associated with the same transmission destination (IP address=192.168.1.100). When the determination result of step 458 is negative determination, processing returns to step 446 since there is server identification data for which determination has not yet been made as to whether or not the server is a redundant server candidate.

In the above example, the above processing (steps 446 to 458) is next executed for the server identification data (=202). The VLAN ID (=1500) of the server 202 is obtained from row 508P2 (FIG. 25) of the port management table 65 based on row 508T2 (FIG. 23) of the server connection destination management table 61. The VLAN ID (=1500) of the server 202 is different from the VLAN ID (=2500) set for the port to which the load balancer 20 is connected (see row 504 of FIG. 25). The server 202 is accordingly determined not to be a redundant server.

The above processing (steps 446 to 458) is also executed for the server identification data (=301). The VLAN ID (=1500) of the server 301 is obtained from row 508P3 of the port management table 65 based on the row 508T3 (FIG. 23) of the server connection destination management table 61. The VLAN ID (=1500) of the server 301 is different from the VLAN ID (=2500 (see row 504 of FIG. 25)) set for the port to which the load balancer 20 is connected. The server 301 is accordingly determined not to be a redundant server.

The server identification data ascertainment processing proceeds to step 460 when determination as a redundant server candidate or not has been made for all the server identification data (201, 202, 301) associated with the same transmission destination (IP address=192.168.1.100).

At step 460, the data analysis section 120 determines whether or not there are plural candidate servers present for the transmission destination IP address identified by the variable a by determining whether or not identification data for plural servers has been stored in the candidate data storage region.

As described above, IP addresses and identification data of target servers are stored associated in the server management table 55D (FIG. 21) for all the servers included in the server systems 420 to 424. At step 440, the server identification data acquisition section 118 acquires from the server management table 55D identification data of servers allocated the transmission destination IP address identified by the variable a. Thus if the VLAN ID and the Segment ID are the same, servers that are actually in different server systems are sometimes stored as candidates. The determination result of step 460 is affirmative determination in cases in which there is identification data of plural servers stored in the candidate data storage region for the transmission destination IP address identified by the variable a. The server identification data ascertainment processing proceeds to step 462 in such cases. The determination result of step 460 is negative determination when there is identification data of only one server stored in the candidate data storage region. The server identification data ascertainment processing proceeds to step 465 in such cases.

Affirmative determination of the determination result of step 460 is an example of ascertaining plural identification data of the technology disclosed herein.

When the determination result of step 460 is affirmative determination, at step 462 the data analysis section 120 references the switch connection destination management table 63. The data analysis section 120 then determines whether or not the load balancer 20 in the server system identified by the variable m is reachable from each of the plural candidate servers. In cases in which the variable m identify the sever system 420, and one of the plural candidate servers is disposed in the server system 422, the load balancer 20 in the server system identified by the variable m is unreachable from this server. When another one of the plural candidate servers is disposed in the server system 420, then the load balancer 20 in the server system identified by the variable m is reachable from that server. Thus at step 464, the data analysis section 120 employs servers able to reach the load balancer 20 in the server system identified by the variable m. Namely, identification data of servers unable to reach the load balancer 20 are erased from the candidate data storage region. The server identification data ascertainment processing then proceeds to step 465.

At step 465 the data analysis section 120 determines whether or not the variable a is a total number A of the transmission destination IP addresses acquired at step 434 (three in the example of m=1 of FIG. 22). When the determination result of step 465 is negative determination, since candidate servers have not yet been sought for all the IP addresses in the server system identified by the variable m, the server identification data ascertainment processing returns to step 436. When the determination result of step 465 is affirmative determination, the server identification data stored in the candidate data storage region corresponding to the server system identified by the variable m includes only identification data of redundant servers in the server system identified by the variable m. At step 466, the identification data of the redundant servers is stored in the redundant configuration management table 67 (FIG. 26). As illustrated in FIG. 26, data of the reliability of the redundant servers is also stored in the redundant configuration management table 67.

At step 468, determination is made as to whether or not the variable m is the same as the total number M of the server systems. When the determination result of step 468 is negative determination, there is a server system for which redundant server ascertainment has not been performed, and so the server identification data ascertainment processing returns to step 431. When the determination result of step 468 is affirmative determination, redundant server ascertainment has been performed for all of the server systems, and so the server identification data ascertainment processing proceeds to step 470.

Figure 28:
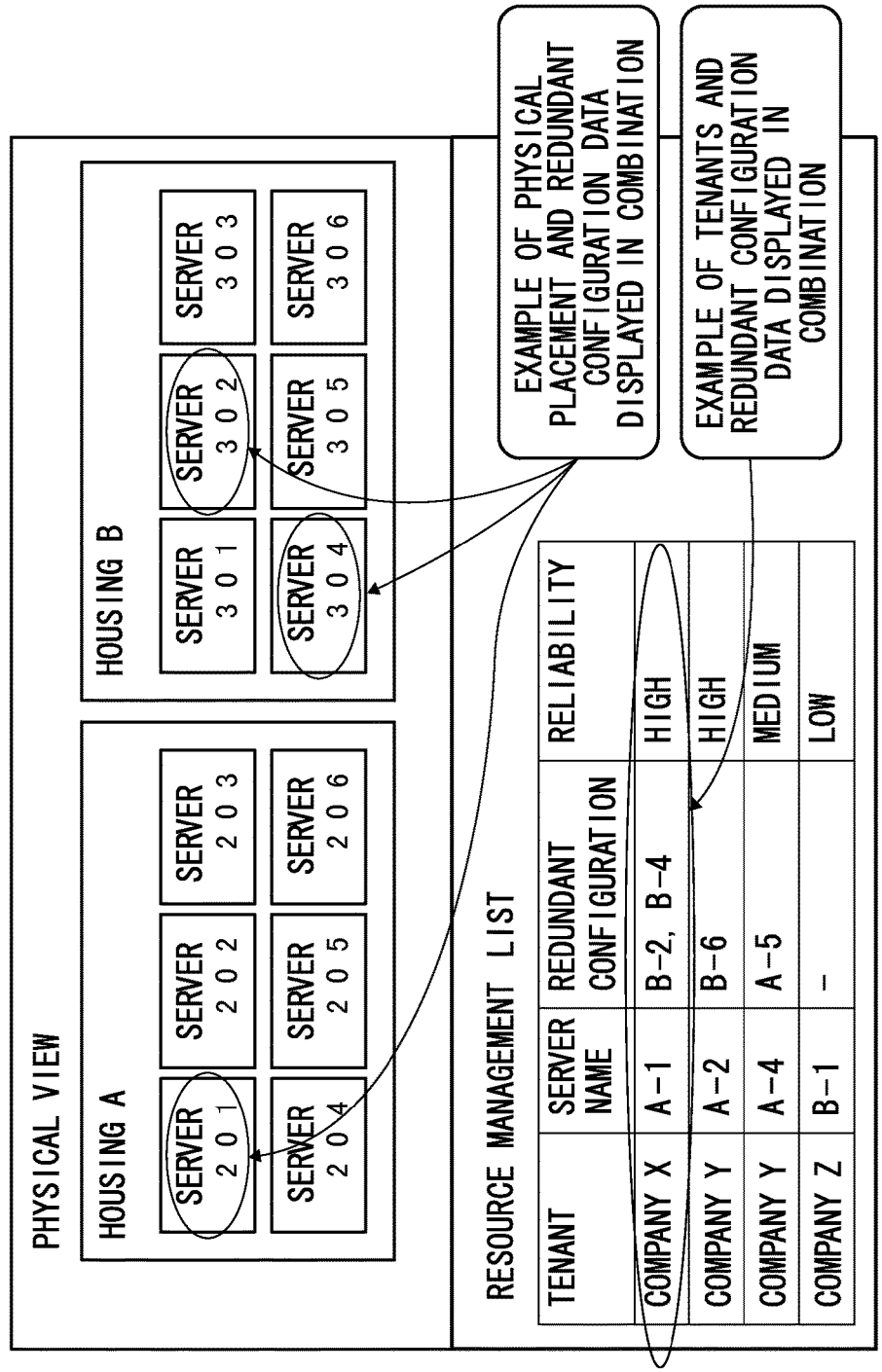
FIG. 28 is a diagram illustrating an example of redundant configuration display of the fourth exemplary embodiment.
Figure 29:
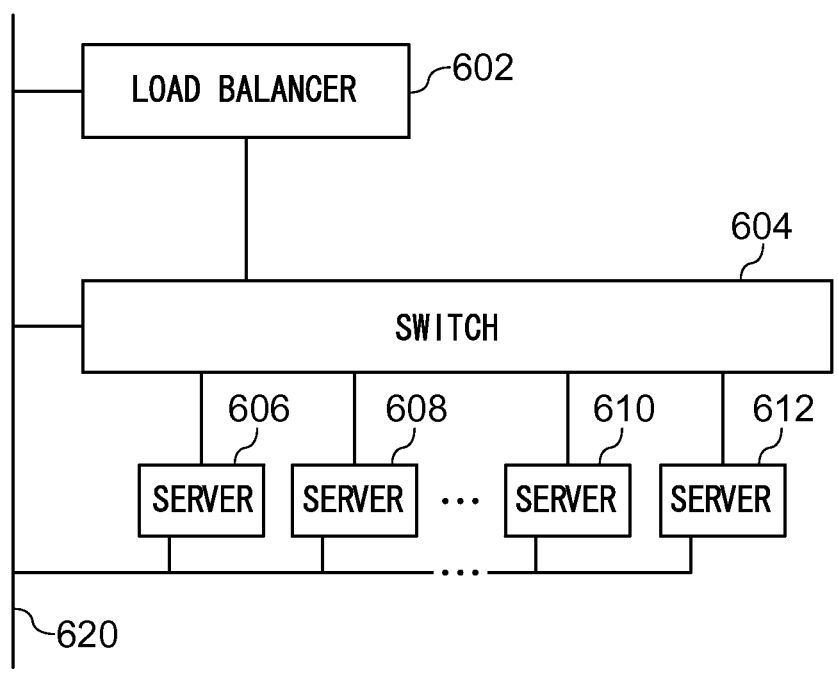
FIG. 29 is a block diagram illustrating a service provision system of related art.

At step 470, the display section 124 acquires items desired for display, for example, tenant names or physical placements, from the secondary storage device 40. At step 472, the display section 124 acquires the redundant configurations from the redundant configuration management table 67 associated with each of the server systems of the secondary storage device 40. The display section 124 displays the redundant configurations in combination with the physical placements as illustrated in the physical view of FIG. 28, together with the tenants, as illustrated in a resource management list of FIG. 28.

Explanation next follows regarding advantageous effects of the fourth exemplary embodiment.

In the fourth exemplary embodiment, the network identifier acquisition section 116 acquires the network identifier (VLAN ID and Segment ID) set for the port 411 of the switch 400 to which the load balancer 20 is connected. The load distribution data acquisition section 112 acquires the load distribution data (IP addresses). The data analysis section 120 acquires the server identification data associated with the load distribution data (IP addresses) for all the server systems. The data analysis section 120 determines whether or not the network identifier associated with the acquired server identification data matches the network identifier set for the port 411 of the switch 400 to which the load balancer 20 is connected. When there are plural server identification data items present for which both network identification data items match, determination is made as to whether or not the load balancer 20 is reachable from each of the servers. Identification data of servers unable to reach the load balancer 20, due to the server being present inside a server system other than the server system in which the load balancer 20 is present, are removed from the candidate servers. The server identification data that finally remain are the redundant servers. This thereby enables redundant servers to be discovered.

Explanation follows regarding modified examples of the fourth exemplary embodiment.

First Modified Example

In the fourth exemplary embodiment, firstly the server identification data acquisition section 118 acquires the server identification data associated with the IP address that is the load distribution data. Secondly the data analysis section 120 acquires from the server identification data associated with the IP address that is the load distribution data, the server identification data for which the network identifier matches the network identifier set for the port 411 of the switch 400 to which the load balancer 20 is connected. Namely, in the fourth exemplary embodiment, candidates for the redundant server are refined using the IP address that is the load distribution data, and then using the network identifier in this sequence. In the first modified example, firstly the network identifier acquisition section 116 acquires server identification data for which the network identifier matches the network identifier set for the port 411 of the switch 400 to which the load balancer 20 is connected. Secondly, the data analysis section 120 acquires the server identification data associated with the IP address that is the load distribution data from the server identification data for which the network identifier matches the network identifier set for the port 411 of the switch 400 to which the load balancer 20 is connected. Namely, the first modified example enables the candidates for the redundant server to be refined using the network identifier, and then using the IP address that is the load distribution data, in this sequence.

Second Modified Example

In the fourth exemplary embodiment, the port management table 65 is provided in the secondary storage device 40 of the management device 10. In a second modified example, port management table 65 is stored in the memory 66 of each of the switches, enabling the management device 10 to acquire the network identifier (VLAN ID and Segment ID) from the switch.

Third Modified Example

In the fourth exemplary embodiment, a two stage virtual network is provided. In a third modified example, virtual networks may be set with a larger number of plural stages than two.

Plural stages of virtual network may also be set in both the second exemplary embodiment and the third exemplary embodiment, similarly to in the fourth exemplary embodiment.

The technology disclosed herein exhibits the advantageous effect of enabling redundant server devices to be ascertained.

All publications, patent applications and technical standards mentioned in the present specification are incorporated by reference in the present specification to the same extent as if the individual publication, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the technology disclosed herein have been described in detail, it should be understood that the various changes, substitutions, and alterations could be made hereto without departing from the spirit and scope of the invention.

What is claimed is:

1. A non-transitory recording medium storing an ascertainment program that causes a computer to execute a process, the process comprising:
    acquiring addresses of a plurality of respective data processing devices, and virtual network identification data that identifies each of a plurality of respective virtual networks virtually defined on a network, the virtual network identification data being associated with the plurality of respective data processing devices;
    ascertaining identification data for each of the plurality of data processing devices based on the acquired virtual network identification data and addresses, association data, stored in a storage section, of addresses and data processing devices, and association data, stored in the storage section, of the virtual network identification data and the plurality of data processing devices; and
    ascertaining as a data processing device group configured redundantly with respect to execution of specific processing, any data processing devices out of the plurality of data processing devices with the same virtual network identification data and the same address as each other, and that are associated with the identification data of the plurality of data processing devices.

2. The non-transitory recording medium of claim 1, wherein in the process:
    the identification data of each of the plurality of respective data processing devices is further associated with any second order virtual network identification data of a plurality of respective second order virtual networks, each of which includes at least one virtual network that is virtually defined in the network and that is within the plurality of virtual networks;
    during the acquisition, the computer is caused to further acquire second order virtual network identification data associated with the plurality of data processing devices; and
    during the ascertainment of the identification data, the computer is caused to ascertain the acquired virtual network identification data, the acquired second order virtual network identification data, and the identification data of each of the plurality of data processing devices associated with the respective acquired addresses.

3. The non-transitory recording medium of claim 1, wherein in the process:
    during the ascertainment of the any data processing devices, a data processing device associated with the acquired virtual network identification data is ascertained from the plurality of data processing devices, and the identification data for each of the plurality of data processing devices is ascertained based on respective addresses of the ascertained data processing devices and the acquired respective addresses of the plurality of data processing devices.

4. The non-transitory recording medium of claim 1, wherein in the process:
    during the ascertainment of the any data processing devices, a data processing device associated with the virtual network identification data associated with the acquired address of each of the plurality of data processing devices is ascertained from the plurality of data processing devices, and identification data for each of the plurality of data processing devices is ascertained based on virtual network identification data of each of the ascertained data processing devices and the acquired virtual network identification data.

5. The non-transitory recording medium of claim 1, wherein in the process:
    when there is a connection between a plurality of respective allocation sections that allocate processing execution requests to each of a plurality of data processing devices executing the processing from among the plurality of data processing devices, and the respective plurality of data processing devices by at least one switch,
    when, during the ascertainment of the identification data, a plurality of identification data items is ascertained to be associated with at least one data processing device of the plurality of data processing devices, based on data of respective routes through the at least one switch between the plurality of the allocation sections and the plurality of respective data processing devices, by determining whether or not there is a route from a data processing device identified by at least one identification data item of the plurality of ascertained identification data items to the allocation section allocating the processing execution request, determination is made as to whether or not the at least one identification data item of the ascertained plurality of identification data items is identification data of the at least one data processing device.

6. An ascertainment method comprising:
    acquiring addresses of a plurality of respective data processing devices, and virtual network identification data that identifies each of a plurality of respective virtual networks virtually defined on a network, the virtual network identification data being associated with the plurality of respective data processing devices;
    ascertaining identification data for each of the plurality of data processing devices based on the acquired virtual network identification data and addresses, association data, stored in a storage section, of addresses and data processing devices, and association data, stored in the storage section, of the virtual network identification data and the plurality of data processing devices; and
    by a processor, ascertaining as a data processing device group configured redundantly with respect to execution of specific processing, any data processing devices out of the plurality of data processing devices with the same virtual network identification data and the same address as each other, and that are associated with the identification data of the data processing devices.

7. The ascertainment method of claim 6, wherein:
    the identification data of each of the plurality of respective data processing devices is further associated with any second order virtual network identification data of a plurality of respective second order virtual networks, each of which includes at least one virtual network that is virtually defined in the network and that is within the plurality of virtual networks;

during the acquisition, second order virtual network identification data associated with the plurality of data processing devices is further acquired; and during the ascertainment of the identification data, the acquired virtual network identification data, the acquired second order virtual network identification data, and the identification data of each of the plurality of data processing devices associated with the respective acquired addresses are ascertained.

8. The ascertainment method of claim 6, wherein:
during the ascertainment of the any data processing devices, a data processing device associated with the acquired virtual network identification data is ascertained from the plurality of data processing devices, and the identification data for each of the plurality of data processing devices is ascertained based on respective addresses of the ascertained data processing devices and the acquired respective addresses of the plurality of data processing devices.

9. The ascertainment method of claim 6, wherein:
during the ascertainment of the any data processing devices, a data processing device associated with the virtual network identification data associated with the acquired address of each of the plurality of data processing devices is ascertained from the plurality of data processing devices, and identification data for each of the plurality of data processing devices is ascertained based on virtual network identification data of each of the ascertained data processing devices and the acquired virtual network identification data.

10. The ascertainment method of claim 6, wherein:
when there is a connection between a plurality of respective allocation sections that allocate processing execution requests to each of a plurality of data processing devices executing the processing from among the plurality of data processing devices, and the respective plurality of data processing devices by at least one switch, when, during the ascertainment of the identification data, a plurality of identification data items is ascertained to be associated with at least one data processing device of the plurality of data processing devices, based on data of respective routes through the at least one switch between the plurality of the allocation sections and the plurality of respective data processing devices, by determining whether or not there is a route from a data processing device identified by at least one identification data item of the plurality of ascertained identification data items to the allocation section allocating the processing execution request, determination is made as to whether or not the at least one identification data item of the ascertained plurality of identification data items is identification data of the at least one data processing device.

11. An ascertainment device comprising:
a processor configured to execute a process, the process comprising:
acquiring addresses of a plurality of respective data processing devices, and virtual network identification data that identifies each of a plurality of respective virtual networks virtually defined on a network, the virtual network identification data being associated with the plurality of respective data processing devices;

ascertaining identification data for each of the plurality of data processing devices based on the acquired virtual network identification data and addresses, association data, stored in a storage section, of addresses and data processing devices, and association data, stored in the storage section, of the virtual network identification data and the plurality of data processing devices; and ascertaining as a data processing device group configured redundantly with respect to execution of specific processing, any data processing devices out of the plurality of data processing devices with the same virtual network identification data and the same address as each other, and that are associated with the identification data of the data processing devices.

12. The ascertainment device of claim 11, wherein:
the identification data of each of the plurality of respective data processing devices is further associated with any second order virtual network identification data of a plurality of respective second order virtual networks, each of which includes at least one virtual network that is virtually defined in the network and that is within the plurality of virtual networks;

during the acquisition, second order virtual network identification data associated with the plurality of data processing devices is further acquired; and during the ascertainment of the identification data, the acquired virtual network identification data, the acquired second order virtual network identification data, and the identification data of each of the plurality of data processing devices associated with the respective acquired addresses are ascertained.

13. The ascertainment device of claim 11, wherein:
during the ascertainment of the any data processing devices, a data processing device associated with the acquired virtual network identification data is ascertained from the plurality of data processing devices, and the identification data for each of the plurality of data processing devices is ascertained based on respective addresses of the ascertained data processing devices and the acquired respective addresses of the plurality of data processing devices.

14. The ascertainment device of claim 11, wherein:
during the ascertainment of the any data processing devices, a data processing device associated with the virtual network identification data associated with the acquired address of each of the plurality of data processing devices is ascertained from the plurality of data processing devices, and identification data for each of the plurality of data processing devices is ascertained based on virtual network identification data of each of the ascertained data processing devices and the acquired virtual network identification data.

15. The ascertainment device of claim 11, wherein:
when there is a connection between a plurality of respective allocation sections that allocate processing execution requests to each of a plurality of data processing devices executing the processing from among the plurality of data processing devices, and the respective plurality of data processing devices by at least one switch, when, during the ascertainment of the identification data, a plurality of identification data items is ascertained to be associated with at least one data processing device of the plurality of data processing devices, based on data of respective routes through the at least one switch between the plurality of the allocation sections and the plurality of respective data processing devices, by determining whether or not there is a route from a data processing device identified by at least one identification data item of the plurality of ascertained identification data items to the allocation section allocating the processing execution request, determination is made as to whether or not the at least one identification data item of the ascertained plurality of identification data items is identification data of the at least one data processing device.

* * * * *